(12) United States Patent
Eom

(10) Patent No.: US 11,278,018 B2
(45) Date of Patent: **\*Mar. 22, 2022**

(54) INSECT TRAP

(71) Applicant: Seoul Viosys Co., Ltd., Ansan-si (KR)

(72) Inventor: Hoon Sik Eom, Ansan-si (KR)

(73) Assignee: Seoul Viosys Co., Ltd., Ansan-si (KR)

( * ) Notice: Subject to any disclaimer, the term of this patent is extended or adjusted under 35 U.S.C. 154(b) by 796 days.

This patent is subject to a terminal disclaimer.

(21) Appl. No.: 16/131,362

(22) Filed: Sep. 14, 2018

(65) Prior Publication Data

US 2019/0008132 A1 Jan. 10, 2019

Related U.S. Application Data

(63) Continuation of application No. PCT/KR2016/010109, filed on Sep. 8, 2016, and a
(Continued)

(30) Foreign Application Priority Data

Mar. 14, 2016 (KR) .................. 10-2016-0030419
Apr. 27, 2016 (KR) .................. 10-2016-0051693
Jul. 22, 2016 (KR) .................. 10-2016-0093593

(51) Int. Cl.
*A01M 1/08* (2006.01)
*A01M 1/06* (2006.01)
*A01M 1/10* (2006.01)

(52) U.S. Cl.
CPC ............... *A01M 1/08* (2013.01); *A01M 1/06* (2013.01); *A01M 1/10* (2013.01)

(58) Field of Classification Search
CPC .................................. A01M 1/08; A01M 1/06
See application file for complete search history.

(56) References Cited

U.S. PATENT DOCUMENTS

| 4,788,789 A | 12/1988 | Boobar et al. |
| 10,681,903 B2 * | 6/2020 | Eom ...................... A01M 1/08 |

FOREIGN PATENT DOCUMENTS

| CN | 200953798 | 10/2007 |
| CN | 202374525 | 8/2012 |

(Continued)

OTHER PUBLICATIONS

Office Action dated Nov. 28, 2019, issued in Chinese Patent Application No. 201610909019.7.
(Continued)

*Primary Examiner* — Jessica B Wong
(74) *Attorney, Agent, or Firm* — H.C. Park & Associates, PLC

(57) ABSTRACT

An insect trap is adapted to attract and collect insects with UV light. The insect trap includes: a main body; an insect filter disposed on the main body and allowing insects to pass therethrough; a motor disposed below the insect filter; a suction fan disposed under the motor and rotated by the motor; a plate-shaped UV LED installation unit disposed above the insect filter and provided with a UV LED module; a buttress supporting the UV LED installation unit above the main body while separating the UV LED installation unit above the main body so as to allow insects to be suctioned into a space between the main body and the UV LED installation unit; and an insect collector disposed under the main body and collecting insects.

25 Claims, 16 Drawing Sheets

Related U.S. Application Data continuation of application No. PCT/KR2016/010104, filed on Sep. 8, 2016.

(56) References Cited

FOREIGN PATENT DOCUMENTS

| | | |
|---|---|---|
| CN | 203788948 | 8/2014 |
| CN | 104488840 | 4/2015 |
| JP | 2011-212006 | 10/2011 |
| KR | 20-0393447 | 8/2005 |
| KR | 20-0425859 | 9/2006 |
| KR | 10-2009-0009373 | 1/2009 |
| KR | 10-2011-0005038 | 1/2011 |
| KR | 10-2012-0097077 | 9/2012 |
| KR | 10-1349733 | 1/2014 |
| KR | 10-2015-0112755 | 10/2015 |
| KR | 10-2015-0124766 | 11/2015 |
| KR | 10-2015-0125271 | 11/2015 |

OTHER PUBLICATIONS

Extended European Search Report dated Oct. 28, 2019, issued in European application No. 16894666.3.
Office Action dated Nov. 27, 2019, issued in Chinese Patent Application No. 201610908542.8.
International Search Report dated Dec. 12, 2016, in International Application No. PCT/KR2016/010104 (with English Translation).
International Search Report dated Nov. 30, 2016, in International Application No. PCT/KR/2016/010109 (with English Translation).
Chinese Office Action dated Jul. 29, 2020 to Chinese Patent Application No. 201610908542.

* cited by examiner

INSECT TRAP

CROSS REFERENCE TO RELATED APPLICATION

This application is a Bypass Continuation of International Patent Application No. PCT/KR2016/010104, filed on Sep. 8, 2016, and a Bypass Continuation of International Patent Application No. PCT/KR2016/010109, filed on Sep. 8, 2016, and claims priority to and the benefit of Korean Patent Application No. 10-2016-0030419, filed on Mar. 14, 2016, Korean Patent Application No. 10-2016-0093593, filed on Jul. 22, 2016, and Korean Patent Application No. 10-2016-0051693, filed on Apr. 27, 2016, all of which are incorporated by reference for all purposes as if fully set forth herein.

BACKGROUND

Field

Exemplary embodiments/implementations of the invention relate generally to an insect trap, and more specifically, to an insect trap that attracts insects by decoy light and collects insects by suctioning the insects using an air stream generated by a suction fan.

Discussion of the Background

Insects that may be potentially harmful to humans have been recently increased in number, due to change of climate conditions such as global warming and social policies. Harmful insects not only damage crops and livestock, but also negatively impact people by transmitting pathogenic bacteria, such as malaria, dengue, Japanese encephalitis, and the like. Particularly, studies on a mosquito insecticide method have been actively conducted due to fears related to the spread of zika virus (ZIKV).

Conventional insecticidal methods may include chemical pest control methods using an insecticide, biological pest control methods using mudfish and the like, physical pest control methods using a blacklight traps and/or carbon dioxide that attracts and kills the harmful insects by applying a high voltage, and environmental pest control methods such as removal of puddles or other environmental conditions favorable to insect larvae. However, chemical pest control methods may cause secondary contamination, and biological pest control methods or environmental pest control methods may be expensive, time consuming, and labor intensive. In addition, conventional physical pest control methods using an insecticide or insect trap may cause user inconvenience due to complicated configurations of the insect trap or endanger users from usage of the high voltage.

An ultraviolet (UV) light source may be used for various purposes, such as medical purposes including sterilization and disinfection, analysis purposes based on variation in intensity upon irradiation of UV light, industrial purposes such as UV curing, beauty treatment such as UV tanning, insect collection, identification of counterfeit notes, and the like. Typical UV lamps utilizing the UV light source include, for example, a mercury lamp, an excimer lamp, a deuterium lamp, and the like. However, typical UV lamps may have high power consumption, high heat generation, short lifespan, and environmental pollution due to toxic gas supplied to the lamps.

In order to address the problems of typical UV light sources, a UV light emitting device (LED) has found favor due to various merits including low power consumption and its eco-friendly characteristics. Accordingly, studies on development of an insect trap that collects insects using a suction fan after attracting the insects using decoy light have been made.

However, conventional insect traps that collect insects using the suction fan after attracting the insects by utilizing a typical UV LED have problems, such as: noise generated by a suction fan due to fouling of dead insects, such as mosquitoes, on the suction fan; escape of mosquitoes from the insect trap; insufficient suctioning of mosquitoes into the insect trap due to difficulty in controlling the speed of the suction fan; and low suction efficiency or high power consumption due to difficulty in controlling an air stream generated by the insect trap.

The above information disclosed in this Background section is only for understanding of the background of the inventive concepts, and, therefore, it may contain information that does not constitute prior art.

SUMMARY

Exemplary embodiments provide an insect trap that is more eco-friendly, provides a more convenient manufacturing process, and secures good efficiency in attracting and suctioning insects.

Exemplary embodiments provide an insect trap that can generate a suitable air stream speed for suctioning mosquitoes while minimizing noise of a suction fan.

Exemplary embodiments provide an insect trap that is provided with a UV LED module having high efficiency in attraction of mosquitoes and emitting light having wavelengths and intensity harmless to humans.

Exemplary embodiments provide an insect trap that can generate a suitable air stream speed for suctioning mosquitoes while suppressing noise caused by vibration of the insect trap.

Additional features of the inventive concepts will be set forth in the description which follows, and in part will be apparent from the description, or may be learned by practice of the inventive concepts.

In accordance with one exemplary embodiment, there is provided an insect trap adapted to attract and collect insects with UV light, the insect trap including: a main body; an insect filter disposed on the main body and allowing insects to pass therethrough; a motor disposed below the insect filter; a suction fan disposed under the motor and rotated by the motor; a plate-shaped UV LED installation unit disposed above the insect filter and provided with a UV LED module; a buttress supporting the UV LED installation unit above the main body while separating the UV LED installation unit above the main body so as to allow insects to be suctioned into a space between the main body and the UV LED installation unit; and an insect collector disposed under the main body and collecting insects.

The insect trap according to the exemplary embodiments can provide an ecofriendly insecticidal method.

The insect trap according to the exemplary embodiments can selectively collect insects by controlling a size of an opening of the insect filter and, particularly, can prevent insects having a larger volume than mosquitoes from being introduced into the insect trap, thereby improving durability of the suction fan while suppressing noise generation.

The insect trap according to the exemplary embodiments includes the suction fan disposed below the motor and can suppress noise generation by controlling the rotational speed and diameter of the suction fan.

The insect trap according to the exemplary embodiments can generate UV light harmless to humans and capable of effectively attracting insects by controlling the wavelength and intensity of UV light emitted from a UV LED module.

The insect trap according to the exemplary embodiments allows the UV LED module to emit spot light to improve an insect attraction effect.

The insect trap according to the exemplary embodiments can generate a high air stream speed providing high insect suction efficiency by controlling the rotational speed of the suction fan and the heights of a main body, an insect collector, and a buttress of the insect trap.

The insect trap according to the exemplary embodiments can suppress noise generation while generating an air stream speed providing high insect suction efficiency by controlling sizes or area ratios of insect passage openings, air collector side openings, an air exhaust port, and a mesh member.

The insect trap according to the exemplary embodiments is provided with a photocatalyst filter to provide a deodorization function using UV light emitted from the UV LED module.

The insect trap according to the exemplary embodiments can maximize the insect attraction effect not only by attracting insects using UV light, but also by generating heat while selectively generating carbon dioxide.

The insect trap according to the exemplary embodiments has a firm assembly structure to suppress noise generation due to vibration of the suction fan and the motor.

The insect trap according to the exemplary embodiments can generate UV light capable of destroying insects collected through efficient use of energy by controlling the wavelength and intensity of UV light emitted from the UV LED module.

The insect trap according to the exemplary embodiments can improve insect attraction efficiency by changing decoy light in various ways.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
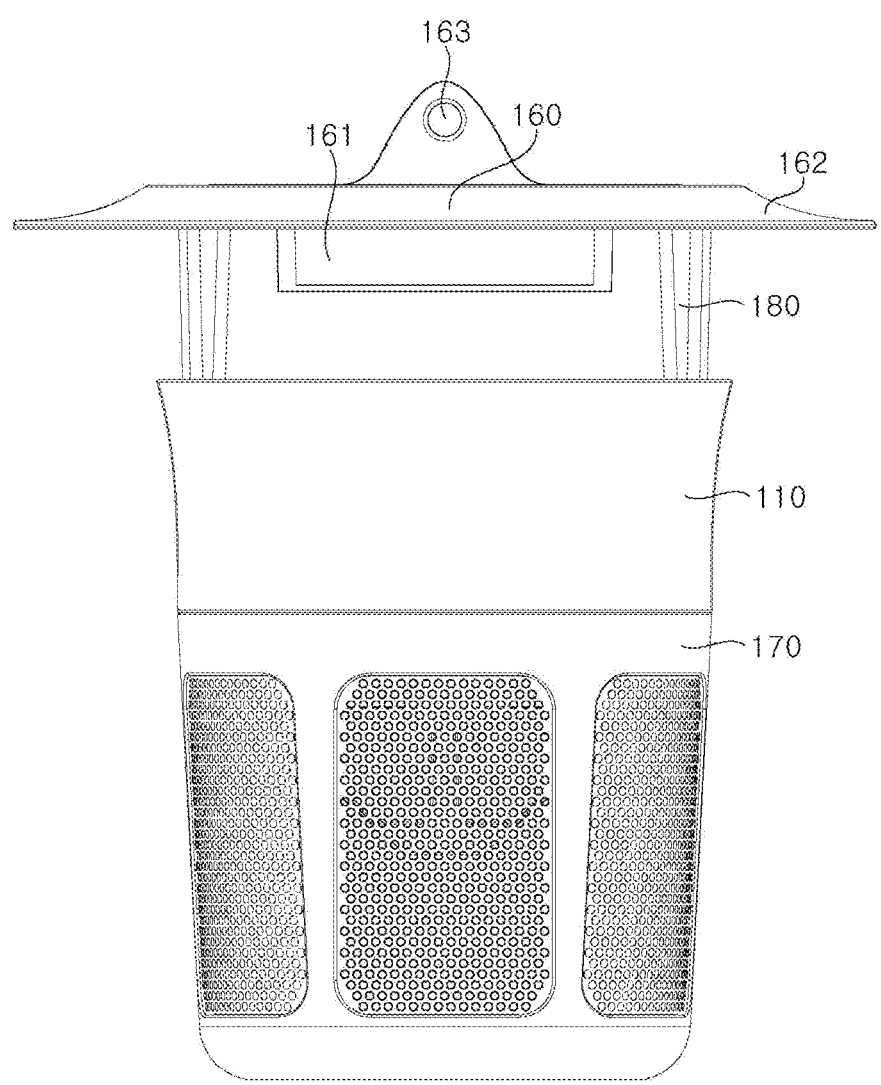
FIG. 1 is a side view of an insect trap according to an exemplary embodiment.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order.

For example, two consecutively described processes may be performed substantially at the same time or performed in an order opposite to the described order. Also, like reference numerals denote like elements.

When an element is referred to as being "on," "connected to," or "coupled to" another element, it may be directly on, connected to, or coupled to the other element or intervening elements may be present. When, however, an element is referred to as being "directly on," "directly connected to," or "directly coupled to" another element, there are no intervening elements present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, embodiments of the present disclosure will be described in detail with reference to the accompanying drawings.

As described above, despite some merits such as eco-friendliness and harmlessness to humans, a typical insect trap configured to collect insects, for example, mosquitoes, using a suction fan after enticing the mosquitoes using decoy light has problems such as very low enticing efficiency, high power consumption, and severe noise generation. Accordingly, in order to solve the problems of the typical insect trap, the inventors of the present disclosure carried out repeated studies and production tests to develop an eco-friendly insect trap that can maximize effects in enticing of insects, for example, mosquitoes, and provide improved suctioning effects without power loss while suppressing noise generation by controlling each component of the insect trap.

Embodiment 1

Figure 2:
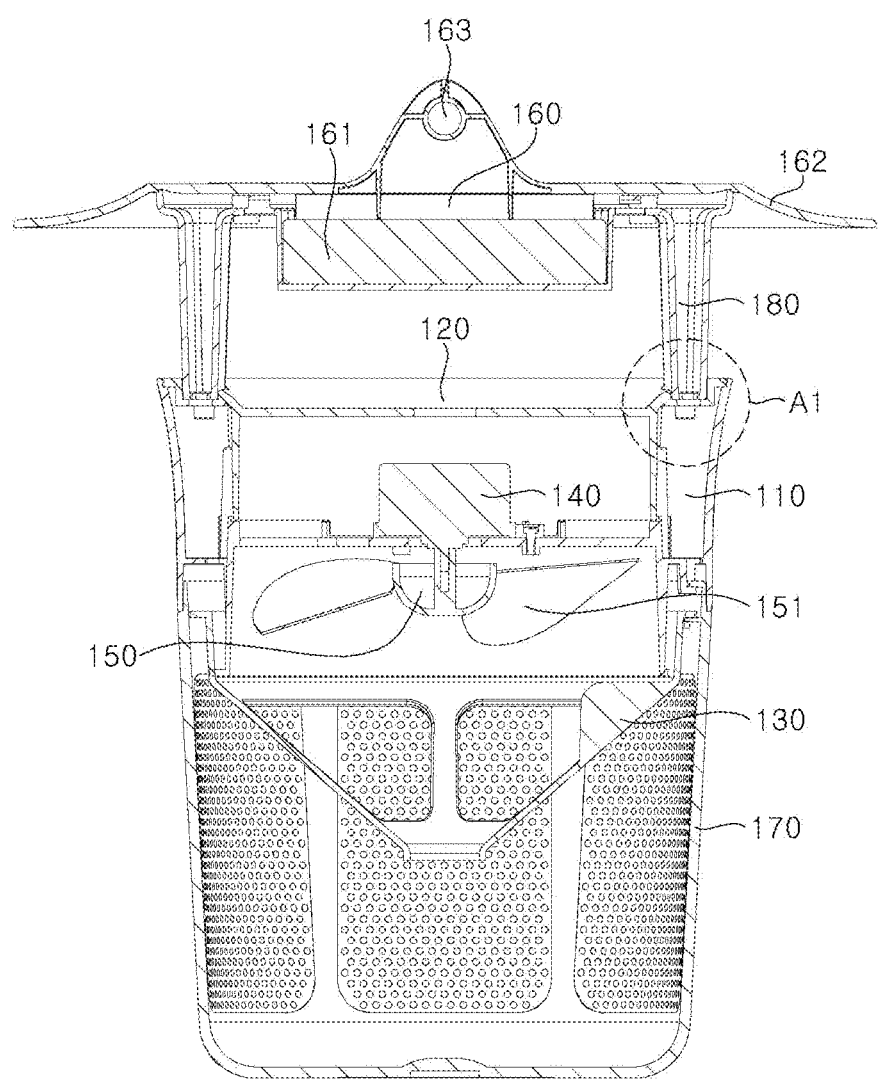
FIG. 2 is a side-sectional view of the insect trap according an exemplary embodiment.
Figure 3:
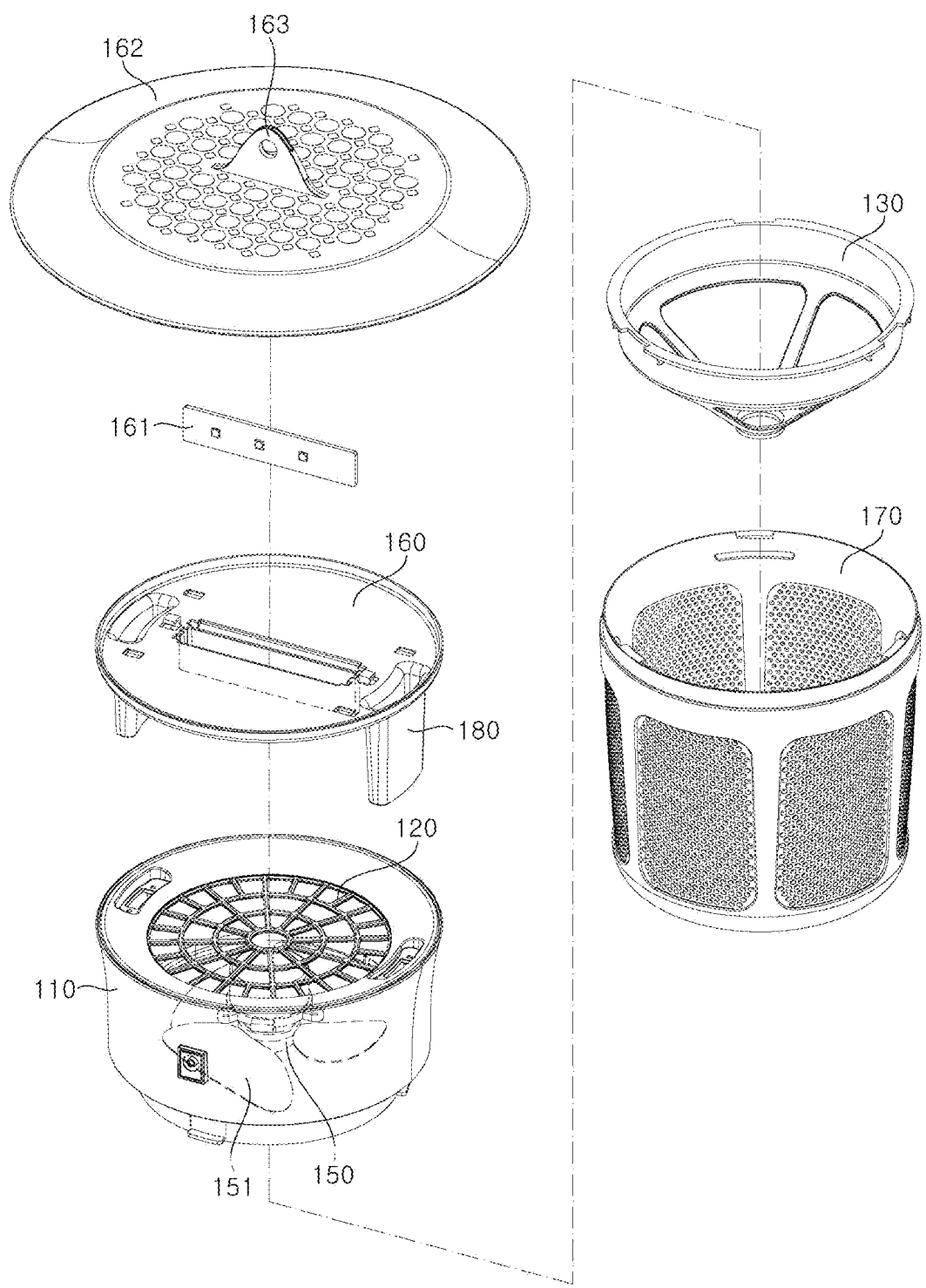
FIG. 3 is an exploded perspective view of an insect trap according an exemplary embodiment.

FIG. 1 is a side view of an insect trap according to a first embodiment of the present disclosure, FIG. 2 is a side-sectional view of the insect trap according to the first embodiment of the present disclosure, and FIG. 3 is an exploded perspective view of the insect trap according to the first embodiment of the present disclosure.

Referring to FIG. 1 to FIG. 3, each component of an insect trap 1000 according to a first embodiment will be described in detail.

In order to collect insects after attracting the insects using UV light, the insect trap 1000 according to an exemplary embodiment includes a main body 110, an insect filter 120 detachably coupled to an upper side of the main body 110 and selectively allowing insects to pass therethrough, an air collector 130 disposed at a lower side of the main body 110, a motor 140 disposed between the air collector 130 and the insect filter 120, a suction fan 150 disposed between the motor 140 and the air collector 130 and rotated by the motor 140, a UV LED installation unit 160 disposed above the insect filter 120 and disposed with a UV LED module 161, and an insect collector 170 detachably coupled to a lower side of the main body 110 below the air collector 130 for collecting insects.

As used herein, insects are not limited to a particular kind of insect and may refer to various kinds of winged insects, particularly, mosquitoes.

Main Body 110

Although the main body is not limited to a particular shape and material, the main body 110 may have a cylindrical shape in order to receive the suction fan 150 therein and may be formed of a commercially available plastic material so as to allow indoor or outdoor use of the insect trap for a long period of time without significant increase in manufacturing costs. The main body 110 is open at upper and lower sides thereof to allow an air stream to pass through the upper and lower sides thereof. The main body 110 has a height of 2 cm to 20 cm, preferably 3 cm to 10 cm.

Referring to FIG. 2 and FIG. 3, the insect filter 120, the motor 140, and the suction fan 150 are mounted inside the main body 110 from the upper side of the main body 110 to the lower side thereof.

Figure 4:
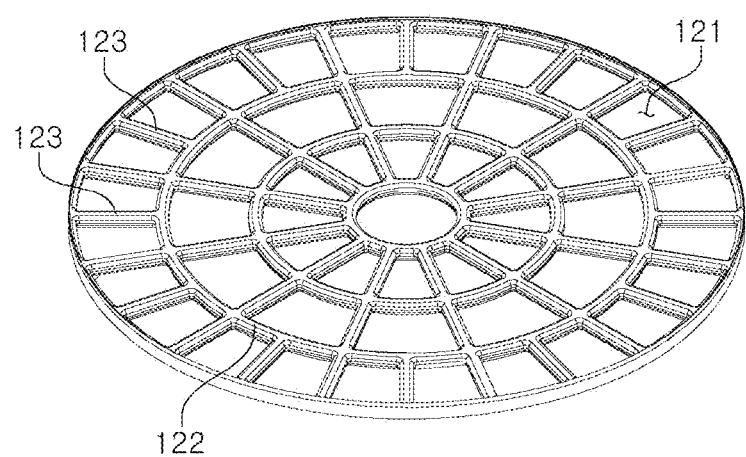
FIG. 4 is a perspective view of an insect filter of the insect trap according to an exemplary embodiment.

FIG. 4 is a perspective view of the insect filter 120 of the insect trap according to the first embodiment of the present disclosure.

Referring to FIG. 4, the insect filter 120 has a lattice shape including a plurality of insect passage openings 121 selectively allowing insects to pass therethrough, and the plurality of insect passage openings may be defined by circular members 122 and radial members 123. Specifically, the size of the insect passage openings 121 may be adjusted by taking into account an average size of insects to be collected, and for the insect filter 120 having a lattice shape as shown in FIG. 4, the size of the insect passage openings 121 can be effectively controlled with low manufacturing costs.

A typical insect trap configured to collect insects using a suction fan in the related art has problems of a short replacement cycle of the insect collector due to collection of insects, such as butterflies, dragonflies and flies, which have a larger volume than mosquitoes, and negative influence on the ecosystem due to collection of beneficial insects as well as harmful insects. Moreover, the typical insect trap has problems such as decrease in lifespan of the motor and noise generation by the suction fan due to attachment of large insects to the suction fan. Accordingly, the inventors of the present disclosure developed the insect trap 1000 that allows the size of the insect passage openings 121 to be controlled such that the insect trap can selectively suction insects and includes an economically feasible insect filter 120.

The insect passage openings 121 are spaced apart from each other by circular members 122 and radial members 123 arranged around the center opening of the insect filter 120. The insect passage openings 121 may have an arc shape, having a central angle of 20° to 40°. Each of the circular members 122 may be spaced apart from another adjacent circular member 122 by a distance of 1.0 cm to 1.5 cm. In this manner, each of the insect passage openings 121 may have an area of 100 mm2 to 225 mm2. Accordingly, the insect passage openings 121 may allow selective passage of insects, particularly, mosquitoes, therethrough, while preventing passage of larger insects, such as butterflies, dragonflies, flies, and the like into the insect trap 1000. As such, durability of the motor 140 may be increased while suppressing the noise generated from the suction fan 150.

The suction fan 150 may be controlled such that insects are suctioned through a lower portion of the suction fan 150, rather than being attached to the suction fan 150. In a conventional insect trap that collects insects using a typical suction fan, the insects may become attached to fan blades, which may adversely affect the rotational balance of the suction fan, thereby causing deterioration in durability of the motor and increased noise. When rotational speed of the suction fan is reduced in order to prevent insects from being attached to the fan blades, however, there is a significant reduction in collection efficiency with respect to insects adjacent the insect trap. More particularly, since insects generally tend to stop flying at an air stream velocity of 0.8 m/s or more, and try to escape from an air stream at an excessively high air stream velocity, the insect trap 1000 according to an exemplary embodiment seeks to prevent insects from being attached to the fan blades 151 while still causing mosquitoes to stop flying and be collected therein through a suction air stream generated by the suction fan 150.

FIG. 4 shows the shape of the insect passage opening 121. Referring to FIG. 2 and FIG. 4, the insect filter 120 may further include buttress coupling holes 182 formed on an outer circumferential surface of the insect passage opening 121. Accordingly, buttresses 180 are primarily inserted into the outer circumferential surfaces of the insect passage openings 121 of the insect filter 120 to be received in the main body 110, whereby the buttresses 180 can be firmly secured to the main body 110 with the UV LED installation unit 160 mounted on the buttresses 180.

In addition, it is desirable that the suction fan 150 be controlled to allow insects to be suctioned through a lower portion of the suction fan 150 while preventing the insects from being attached to the suction fan 150. In a conventional insect trap that collects insects using a typical suction fan, insects can be attached to fan blades, which can adversely affect the rotational balance of the suction fan, thereby causing deterioration in durability of the motor and noise increase. When the rotational speed of the suction fan is reduced in order to prevent insects from being attached to the fan blades, however, there is a significant reduction in collection efficiency with respect to insects adjacent the insect trap. More particularly, since insects generally tend to stop flying at an air stream velocity of 0.8 m/s or more and try to escape from an air stream at an excessively high air stream velocity, the inventors of the present invention developed an insect trap 1000 adapted to prevent insects from being attached to the fan blades 151 while still causing mosquitoes to stop flying and be collected therein through a suction air stream generated by the suction fan 150.

To this end, the number of fan blades 151 may be two to six, preferably three or four, and the suction fan 150 may have a rotational speed of 1500 rpm to 2800 rpm, preferably 1800 rpm to 2800 rpm. If the number of fan blades 151 is less than two or the rotational speed of the suction fan 150 is less than 1500 rpm, there can be a problem of deterioration of a mosquito collection effect, and if the number of fan blades 151 exceeds six or the rotational speed of the suction fan 150 exceeds 2800 rpm, there is a problem of excessive attachment of dead bodies of mosquitoes to the suction fan 150 and fan blades 151 or an increase of noise above 38 dBA.

The fan blades 151 may be formed in a rounded shape having a constant or variable radius of curvature instead of a flat shape, and may have a height of 5 mm to 30 mm from a lowermost end to an uppermost end thereof. The suction fan 150 may have a diameter of 60 mm to 120 mm, preferably 80 mm to 110 mm. In some embodiments, a minimum distance between the suction fan 150 and an inner wall of the main body 110 may be controlled to 1 mm to 5 mm in order to minimize noise generation by the suction fan 150 while effectively generating a suction air stream.

Furthermore, a ratio of vertical distance from the main body 110 to the UV LED installation unit 160 to height of the main body 110 may range from 1:1 to 1:2, and a ratio of vertical distance from the insect collector 170 to the UV LED installation unit 160 to height of the insect collector 170 may range from 1:0.5 to 1:2. Within these ratios, the insect trap 100 can easily suction insects adjacent the insect trap 1000 while preventing the insects from being attached to the suction fan 150.

Accordingly, within these numerical ranges, the insect trap 1000 can control an air stream generated between the insect filter 120 and the UV LED installation unit 160 by the suction fan 150 to have a velocity of 0.5 m/s to 2.5 m/s, preferably 0.6 m/s to 2.5 m/s, more preferably 0.7 m/s to 2.5 m/s, for example, 0.7 m/s to 2.0 m/s, and can cause insects to stop flying and being collected with high efficiency into the insect collector 170 without attachment of the insects to the suction fan 150, while suppressing noise generation by the suction fan 150.

With the structure wherein the motor 140 is disposed below the insect filter 120 and the suction fan 150 is provided to a lower side of the motor 140, the insect trap 1000 can considerably reduce noise generation by the motor 140 and the suction fan 150.

Air Collector 130

Figure 5:
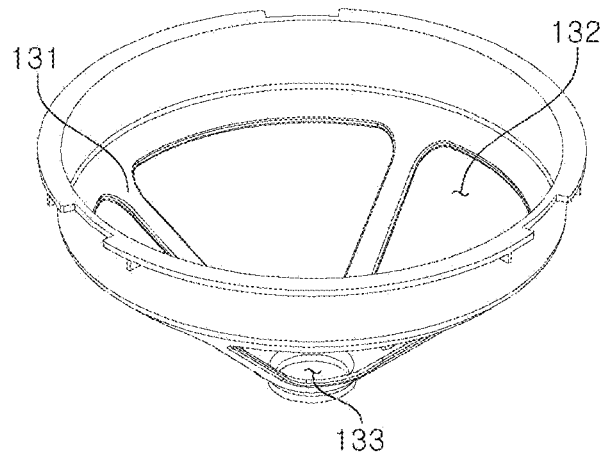
FIG. 5 is a perspective view of an air collector of the insect trap according to an exemplary embodiment.
Figure 10:
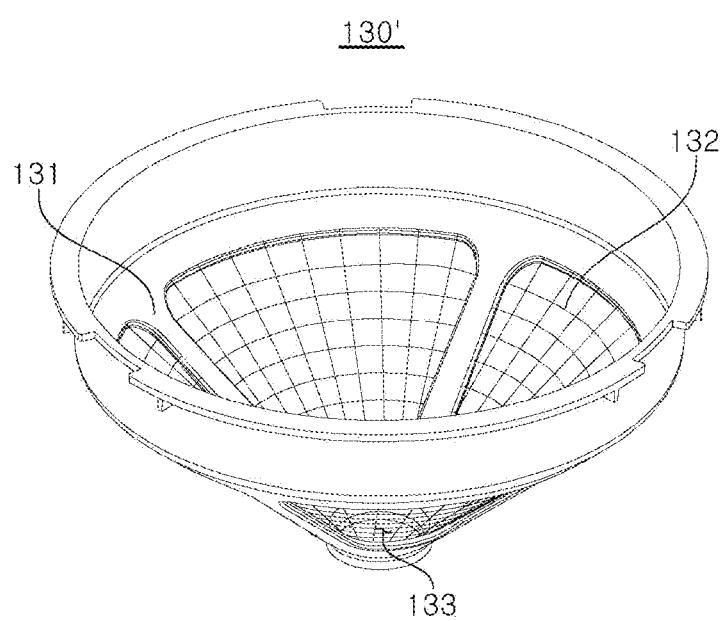
FIG. 10 is a perspective view of an air collector to an exemplary embodiment.

FIG. 5 and FIG. 10 are views of an air collector according to one embodiment of the present disclosure.

The air collector 130 or 130' is provided to the lower side of the main body 110, and may include air collector ribs 131, air collector side openings 132, and an air exhaust port 133 such that insects suctioned by the suction fan 150 can be discharged to the insect collector 170. The air collector 130 has a conical shape, the diameter of which gradually decreases with increasing distance from the suction fan 150. Namely, the air collector 130 preferably has a conical shape in order to allow an air stream generated by the suction fan 150 to effectively flow to the insect collector 170 disposed at a lower side of the insect trap without dispersing the air stream, and includes the air collector side openings 132 to allow the air stream generated by the suction fan 150 to effectively escape from the insect trap 1000. The air collector side openings 132 are not limited to a particular shape and may have a mesh shape, as shown in FIG. 10, and the area of the side openings formed in the mesh shape may be controlled to prevent insects, particularly, mosquitoes, from passing therethrough.

Accordingly, the insect trap 1000 according to the first embodiment may be configured to collect insects in the insect collector 170 and to prevent the insects from escaping from the insect trap 1000 through the air collector 130 when the insects are suctioned into the insect trap 1000 by the suction fan 150.

On the other hands, a ratio of diameter of the air exhaust port 133 to diameter of the suction fan 150 may range from 1:2 to 1:9, preferably 1:3 to 1:5. Within this range of ratio, the insect trap enables easy control of air stream velocity by the suction fan 150. In alternative exemplary embodiments, the air collector 130 may be omitted.

Insect Collector 170

Figure 6:
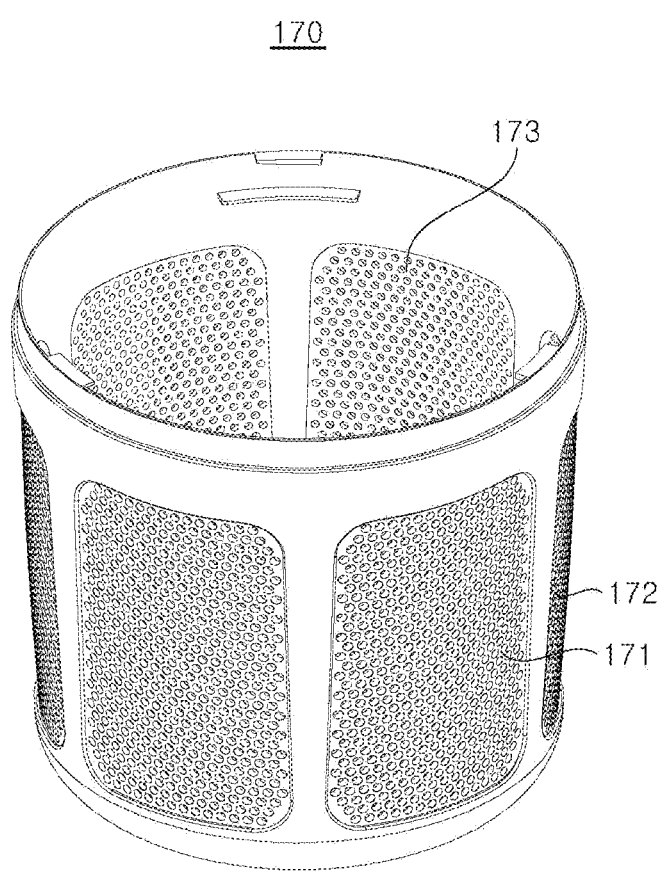
FIG. 6 is a perspective view of an insect collector of the insect trap according to an exemplary embodiment.
Figure 11:
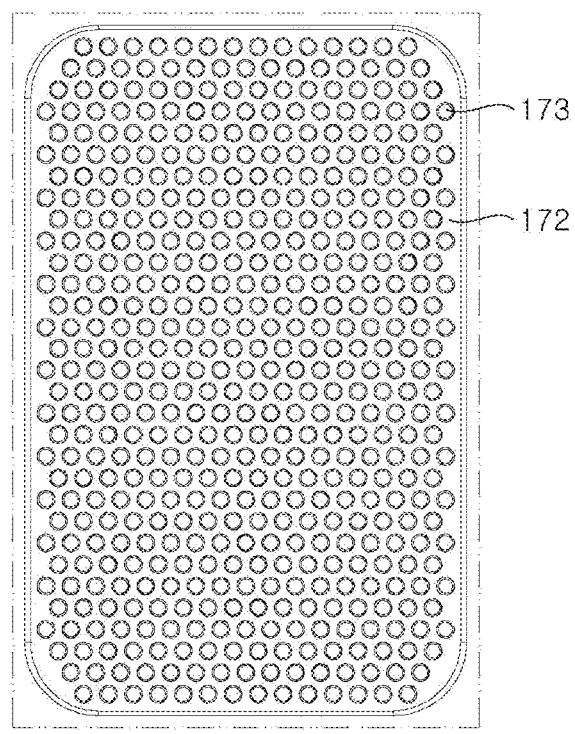
FIG. 11 is a view of a mesh of the insect trap according an exemplary embodiment.

FIG. 6 is a perspective view of an insect collector of the insect trap according to the first embodiment of the present disclosure and FIG. 11 is a view of a mesh member of the insect trap according to the first embodiment of the present disclosure.

Referring to FIG. 6 and FIG. 11, the insect collector 170 may include at least one mesh member 171 through which air is discharged to the outside by the suction fan 150. The mesh member 171 may include mesh ribs 172 and mesh openings 173 formed between the mesh ribs 172 such that an air stream generated by the suction fan 150 is discharged from the insect collector 170 through the mesh openings 173. The mesh opening 173 may have a diameter of 1 mm to 3 mm to provide a smooth air flow while preventing the collected insects from escaping therethrough.

Specifically, the insect collector 170 may include one to ten mesh members 171, for example, three to eight mesh members, and each of the mesh members 171 may include 300 to 700 mesh openings 173, preferably 400 to 600 mesh openings 173.

Furthermore, a ratio of total area of the insect passage openings 121 to total area of the mesh openings 173 may range from 1:0.8 to 1:3.0, preferably from 1:0.8 to 1:2.0. Within this range of ratio, insects collected in the insect collector 170 do not obstruct an air stream discharged from the insect trap 1000 even in the case where the insects collected in the insect collector 170 occupy ½ the volume of the insect collector 170.

That is, the insect collector 170 allows an air stream generated by the suction fan 150 to be effectively discharged from the insect trap 1000, whereby mosquitoes collected in the insect collector 170 are dried and killed.

UV LED Installation Unit 160

Referring to FIG. 1 to FIG. 3, the UV LED installation unit 160 may have a plate shape. Specifically, the UV LED installation unit 160 may be formed in a similar shape and/or size to the shape and size of the main body 110. For example, in an embodiment wherein the main body 110 has a circular shape, the UV LED installation unit 160 may have a disk shape having a similar size to the size of the main body 110.

With this structure, the UV LED installation unit 160 restricts flow of an air stream generated by the suction fan 150 into a space defined between the UV LED installation unit 160 and the main body 110, thereby improving efficiency of generating a suction air stream into the insect trap 1000. As a result, the suction fan 150 is not required to be rotated at high rpm, thereby minimizing noise generation.

In some embodiments, the insect trap may further include a buttress 180 configured to support the UV LED installation unit 160 above the main body 110 while separating the UV LED installation unit 160 from the main body 110 so as to allow insects to be suctioned into the space between the main body 110 and the UV LED installation unit 160, and the UV LED installation unit 160 may include a UV LED module 161 and may further include a UV LED installation unit cap 162.

Although the shape and number of buttresses 180 are not particularly limited, two buttresses 180 are disposed to face each other in order to minimize restriction of an insect introduction area by the buttresses 180 while stably supporting the UV LED installation unit 160.

Referring to FIG. 3, the insect trap is provided with a plurality of buttresses 180 and the UV LED module 161 is disposed between the buttresses 180 so as not to block light emitted from the UV LED module 161 in front of the UV LED module 161. Accordingly, the insect trap according to the first embodiment can improve efficiency in attraction of mosquitoes using UV light emitted from the UV LED module 161.

Figure 13:
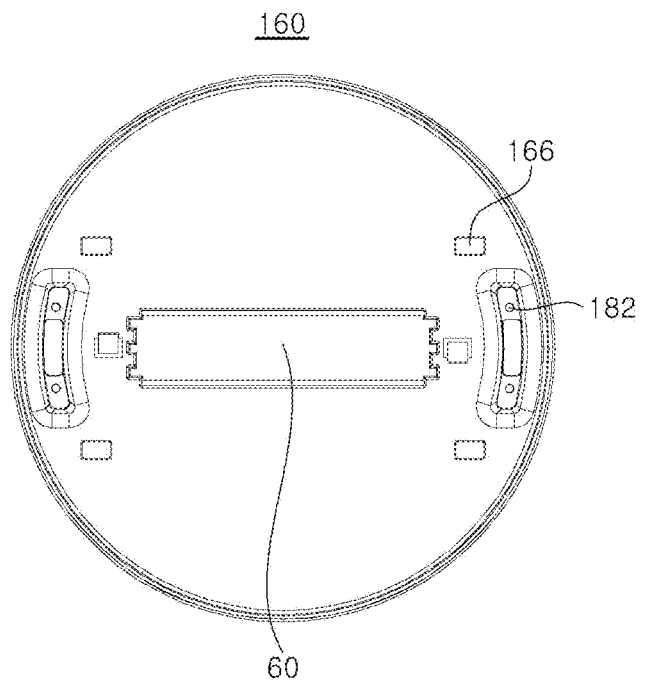
FIG. 13 is a plan view of a UV LED installation unit of the insect trap according to an exemplary embodiment.

Referring to FIG. 3 and FIG. 13, the buttresses 180 may be disposed to block light emitted from the UV LED module 161 at a side of the UV LED module 161. For example, the UV LED installation unit 160 may further include a UV LED module insertion hole 60 through which the UV LED module 161 is mounted on the UV LED installation unit 160, and the length of a side surface of the buttress 180 formed in the horizontal direction with respect to a direction of light emitted from the UV LED module 161 may be 1 to 3 times longer than the length of a side surface of the UV LED module insertion hole 60 formed in the horizontal direction with respect to the direction of light emitted from the UV LED module 161.

Accordingly, when a user works at one side of the insect trap 1000 with reference to the direction of light emitted from the UV LED module 161 in the insect trap 1000, the insect trap 1000 can prevent the user from suffering eye fatigue while maintaining high efficiency in attraction of mosquitoes.

Figure 12:
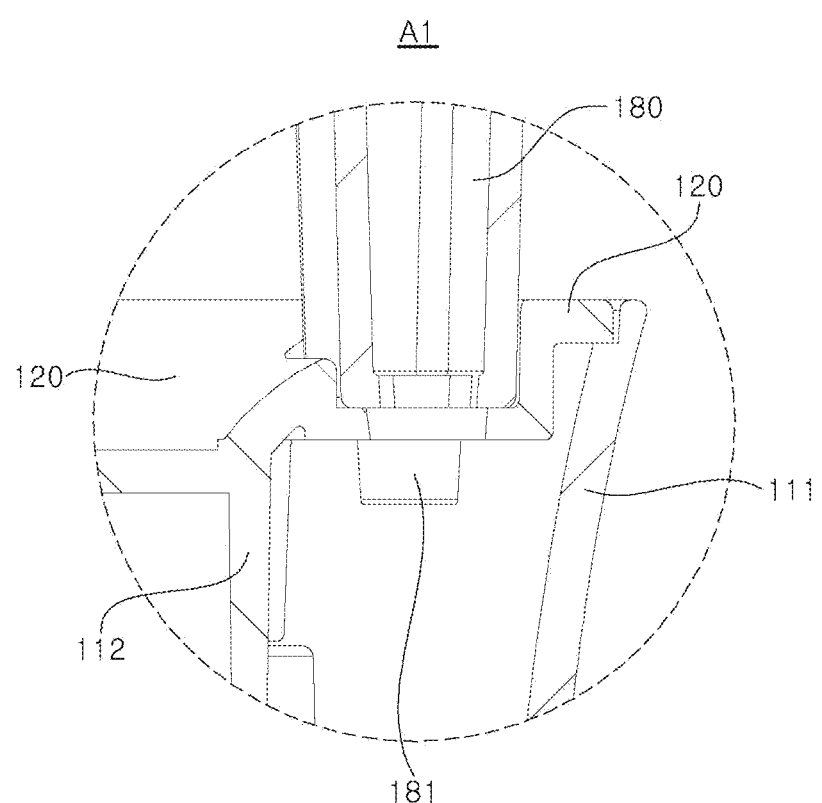
FIG. 12 is a view of a fastening portion between a buttress and a main body of the insect trap according to an exemplary embodiment.

Referring to FIG. 12, the buttresses 180 may be primarily inserted into the outer circumferential surfaces of the insect passage openings of the insect filter 120 and then fitted into a gap between an outer wall 111 and an inner wall 112 of the main body. Furthermore, referring to FIG. 12 and FIG. 13, each of the buttress coupling holes 182 is formed at a distal end of the buttress 180 extending from a lower surface of the UV LED installation unit 160 such that the buttress 180 can be firmly secured to the main body 110 by a buttress fastening member 181. With this structure, the insect trap according to the first embodiment can suppress noise generation even when vibration is generated from the suction fan 150.

The height of the buttress 180 may be adjusted such that the UV LED installation unit 160 is separated a distance of 1 cm to 10 cm, preferably 3 cm to 5 cm, from the main body 110 in a vertical direction. Specifically, the height of the buttress may be the same as the separation distance between the UV LED installation unit 160 and the main body 110. If the separation distance between the UV LED installation unit 160 and the main body 110 in the vertical direction is less than 3 cm, the space defined between the UV LED installation unit 160 and the main body 110, into which insects are suctioned, becomes too small, thereby causing deterioration in insect collection efficiency, and if the separation distance therebetween is greater than 5 cm, the air stream generated by the suction fan 150 does not have sufficient intensity, thereby causing deterioration in insect collection efficiency.

Accordingly, when insects are enticed by UV light and approach the insect trap 1000, the insects are suctioned into the space between the main body 110 and the UV LED installation unit 160 by the suction air stream generated by the suction fan 150, pass through the insect filter 120 and the suction fan 150, and finally collected by the insect collector 170 disposed under the air collector 130.

Referring to FIG. 13, the UV LED module 161 may be mounted on the UV LED installation unit 160 by downwardly inserting the UV LED module 161 into the UV LED installation unit 160 through an upper surface thereof. Specifically, the UV LED module 161 may be mounted on the lower surface of the UV LED installation unit 160 through a UV LED module insertion hole 60. By way of example, as shown in FIG. 3, the UV LED installation unit cap 162 is separated from an upper end of the UV LED installation unit 160 and then the UV LED module 161 is inserted into the UV LED module insertion hole 60 on the upper surface of the UV LED installation unit 160 in order to mount the UV LED module 161 thereon.

Figure 14:
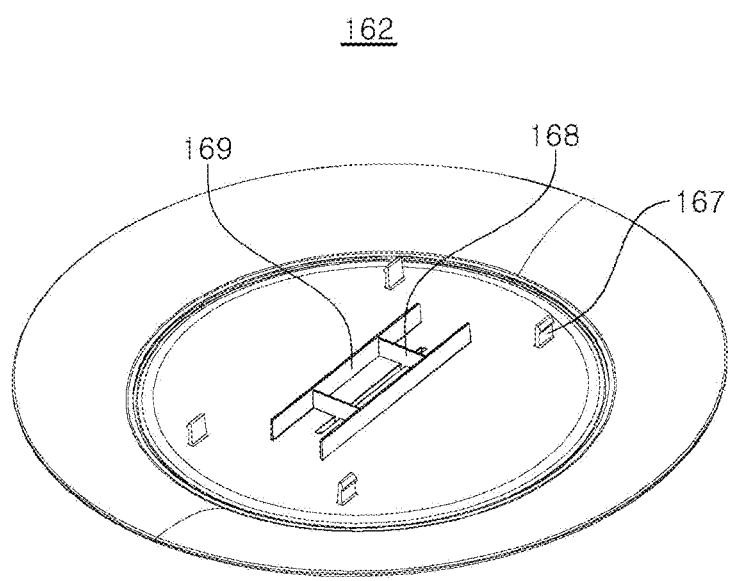
FIG. 14 is a view of a lower surface of a UV LED installation unit cap of the insect trap according to an exemplary embodiment.

Referring to FIG. 13 and FIG. 14, the UV LED installation unit cap 162 may be detachably mounted on the UV LED installation unit 160 by inserting a UV LED installation unit cap-fastening member 167, which is formed on a lower surface of the UV LED installation unit cap 162, into a UV LED installation unit cap-coupling hole 166 formed in the UV LED installation unit 160. In addition, the insect trap according to the first embodiment may further include a transparent UV LED module cover, which has a shape corresponding to the UV LED module 161 and protects the UV LED module 161. Accordingly, the insect trap 1000 according to the first embodiment can prevent mosquitoes introduced into the insect trap from being introduced into a space in which the UV LED module 161 is mounted on the UV LED installation unit 160, or from directly contacting the UV LED module 161, thereby preventing deterioration in durability of the UV LED module 161 by foreign matter or mosquitoes introduced into the insect trap.

Figure 15:
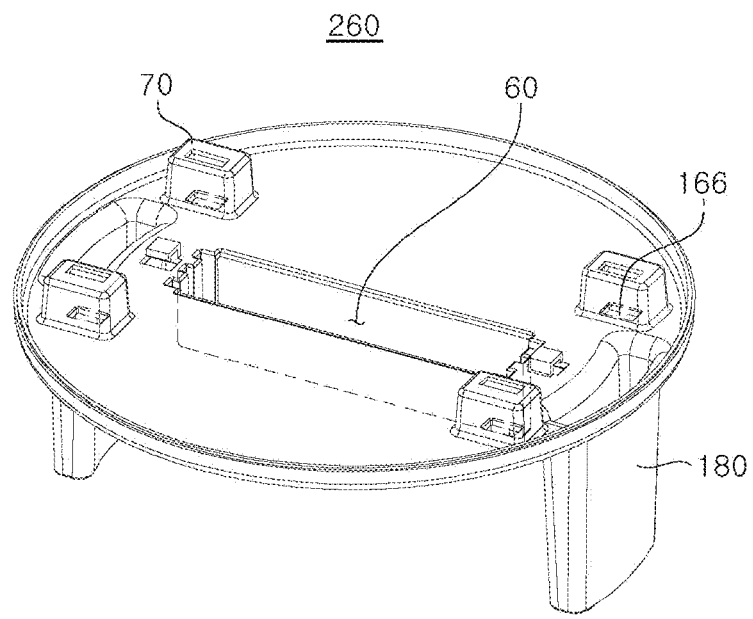
FIG. 15 is a view of a UV LED installation unit of the insect trap according to an exemplary embodiment.

Referring to FIG. 15, the insect trap 1000 according to the first embodiment may further include a UV LED installation unit cap-fastening member cap 70, which is formed on an upper surface of the UV LED installation unit cap-coupling hole 166 and covers the UV LED installation unit cap-fastening member 167. The UV LED installation unit cap-fastening member cap 70 may be formed of any material. For example, the UV LED installation unit cap-fastening member cap 70 may be formed of a plastic material to secure economic feasibility or may be formed of a rubber material to reduce noise due to vibration of the UV LED installation unit 260 and the UV LED installation unit cap 162; 262.

Accordingly, the insect trap 1000 can prevent mosquitoes from being introduced into a space between the UV LED installation unit cap-fastening member 167 and the UV LED installation unit cap-coupling hole 166. As a result, the insect trap 1000 can prevent light emitted from the UV LED modules 161, 261, 361 from being blocked by the mosquitoes by preventing mosquitoes from being introduced into the UV LED module insertion hole 60, thereby maintaining high efficiency in attraction of mosquitoes.

Furthermore, referring to FIG. 14, the insect trap 1000 may include a UV LED module-securing member 168 and a first UV LED module cover-securing member 169 disposed on the lower surface of the UV LED installation unit cap 162 to secure the UV LED module 161 and the UV LED module cover (not shown) to the UV LED installation unit 160.

Accordingly, when the UV LED module 161 is mounted on the UV LED installation unit 160, the UV LED module cover (not shown) is further mounted thereon after separating the UV LED installation unit cap 162 from the UV LED installation unit 160, whereby the insect trap 1000 can prevent mosquitoes from being introduced into or contacting the UV LED module 161. Furthermore, with the structure wherein the UV LED module-securing member 168 and the first UV LED module cover-securing member 169 are disposed on the lower surface of the UV LED installation unit cap 162, the insect trap 1000 can prevent noise generation due to vibration of the UV LED module 161 and the UV LED module cover even if vibration is generated upon rotation of the suction fan 150.

Figure 16:
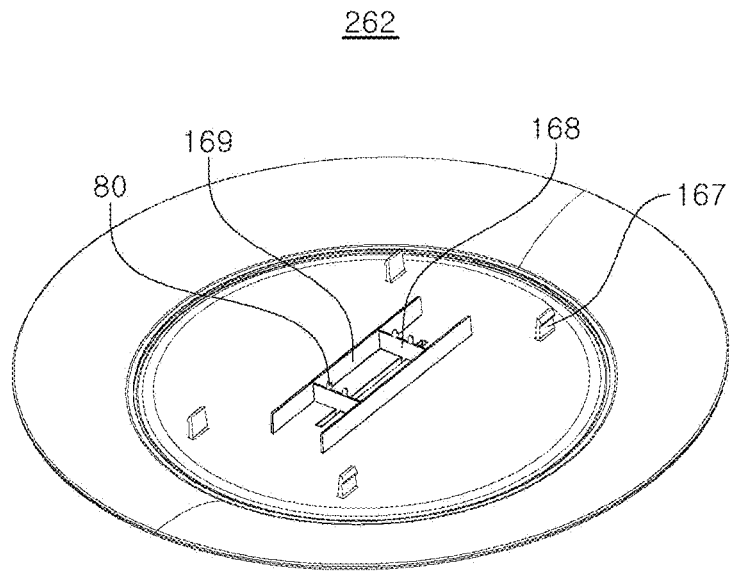
FIG. 16 is a view of the lower surface of the UV LED installation unit cap of the insect trap according to an exemplary embodiment.

Furthermore, referring to FIG. 16, the insect trap 1000 may further include a second UV LED module cover-securing member 80, which protrudes from the UV LED module-securing member 168. The second UV LED module cover-securing member 80 may secure the UV LED module cover (not shown) by applying pressure thereto in the vertical direction or the horizontal direction with reference to the upper surface of the UV LED installation unit 160. By way of example, as shown in FIG. 16, the second UV LED module cover-securing member 80 may protrude from a single UV LED module-securing member 168 and may secure two UV LED module covers (not shown) disposed between the UV LED modules 161, 261, 361 by applying pressure thereto in a direction away from the UV LED modules.

Accordingly, the insect trap 1000 allows the UV LED module cover (not shown) to be firmly secured by the UV LED module cover-securing members, thereby preventing noise generation due to vibration of the UV LED module cover (not shown) even if vibration is generated upon rotation of the suction fan 150.

In addition, the UV LED module 161 mounted on the UV LED installation unit 160 may be electrically connected to a power source.

In the insect trap 1000 according to the first embodiment, the UV LED module 161 may be mounted on the UV LED installation unit 160 such that light emitted from the UV LED module 161 travels in a horizontal direction with respect to the ground or gravity. Insects generally stay at a height of about 1.5 m from the ground for the longest period of time upon flying. Thus, in the structure wherein the insect trap 1000 is installed at a height of about 1.5 m from the ground, insects are strongly stimulated by light emitted from the UV LED module 161 in the horizontal direction with respect to the ground and can be effectively enticed into the insect trap 1000.

Furthermore, as shown in FIG. 3, the UV LED installation unit cap 162 is formed on an upper surface thereof with a UV LED installation unit cap holder 163 to hold the insect trap 1000 to a tree branch and the like at a height of about 1.5 m when used outdoors.

Although not shown in FIG. 3, a material capable of reflecting UV light emitted from the UV LED module 161 may be attached to or coated onto a lower surface of the UV LED installation unit 160. Silver or aluminum may be used as the material capable of reflecting the UV light, without being limited thereto, and may be coated onto the lower surface of the UV LED installation unit 160. The lower surface of the UV LED installation unit 160 may further include a round or irregular pattern having a variety of shapes to scatter the light emitted from the UV LED module 161.

Referring to FIG. 1 to FIG. 3, the UV LED installation unit cap 162 may be mounted on an upper surface of the UV LED installation unit 160 and extends beyond the UV LED installation unit 160 in the horizontal direction. The material and shape of the UV LED installation unit cap 162 may be the same as those of the UV LED installation unit 160, without being limited thereto. For example, in an embodiment wherein the UV LED installation unit 160 has a circular shape, the UV LED installation unit cap 162 may have a shape coaxial with the UV LED installation unit 160 and having a larger diameter than the UV LED installation unit 160.

Preferably, the UV LED installation unit cap 162 has a 3.5 cm to 7 cm greater diameter than the UV LED installation unit 160. If the diameter of the UV LED installation unit cap 162 is greater than the UV LED installation unit 160 by a length of less than 3.5 cm, the air stream generated by the suction fan 150 can be dispersed instead of being collected towards the side surface or the lower surface of the UV LED installation unit 160, and if the diameter of the UV LED installation unit cap 162 is greater than the UV LED installation unit 160 by a length of greater than 7 cm, there can be a problem of unnecessarily blocking the light emitted from the UV LED module 161. Specifically, the UV LED installation unit 160 may have a diameter of 8 cm to 20 cm and the UV LED installation unit cap 162 may have a diameter of 10 cm to 25 cm. Within these diameter ranges, the diameter of the UV LED installation unit cap 162 is greater than the diameter of the UV LED installation unit 160 by a length of 3.5 cm to 7 cm. Further, an outer periphery of the UV LED installation unit cap 162 has a linear or curved shape and may extend to be placed below the UV LED installation unit, specifically, by a length of about 6 mm to 10 mm, thereby effectively blocking the suction air stream into the insect trap 1000.

In the insect trap 1000 according to the first embodiment, wherein the UV LED installation unit 160 and the UV LED installation unit cap 162 have diameters within the above ranges, the air stream generated by the suction fan 150 has a velocity of 0.5 m/s to 3.0 m/s, preferably 0.5 m/s to 2.5 m/s, more preferably 0.6 m/s to 2.5 m/s, for example, 0.7 m/s to 2.5 m/s, specifically, 0.7 m/s to 2.0 m/s, as measured in a region extending from the UV LED installation unit cap 162 to an upper end of the main body 110 in the vertical direction, thereby providing a suitable air stream velocity causing mosquitoes to stop flying and be suctioned into the insect trap 1000.

As described above, the UV LED installation unit 160 is separated a distance of 2 cm to 5 cm from the insect filter 120 and the diameter of the UV LED installation unit cap 162 is adjusted to maintain the air stream generated by the suction fan 150 without being influenced by external wind, whereby the insect trap can stably suction insects, enticed by UV light from the UV LED module, into the insect filter 120.

UV LED Module 161, 261, 361

Figure 7:
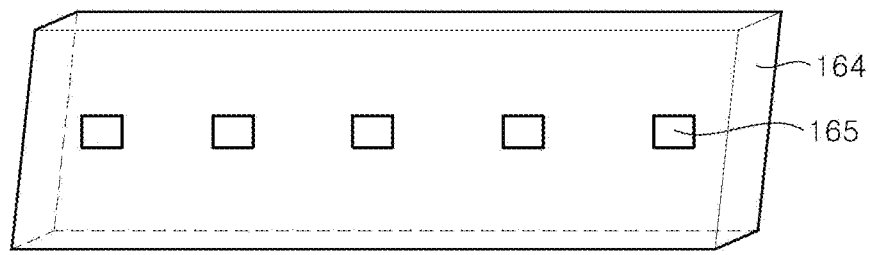
FIG. 7, FIG. 8, and FIG. 9 are views of UV LED modules according to exemplary embodiments.
Figure 8:
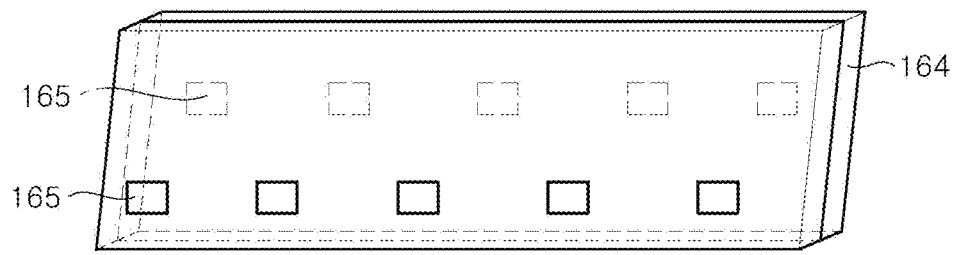
Figure 9:
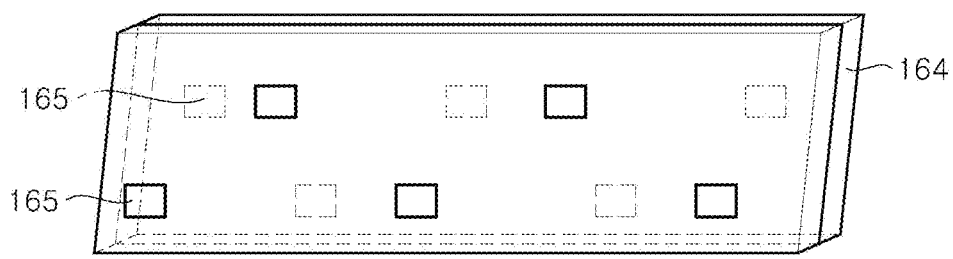

FIG. 7, FIG. 8, and FIG. 9 are views of UV LED modules according to embodiments of the present disclosure.

The UV LED modules 161, 261, 361 can emit at least one type of light selected from among UV light, visible light and IR light, preferably UV light. With regard to insect enticing wavelengths, reports say that flies and leafhoppers are enticed by light at a wavelength of about 340 nm or about 575 nm, and moths and mosquitoes are enticed by light having a wavelength of about 366 nm. In addition, reports say that other general harmful insects are relatively enticed by light having a wavelength of about 340 nm to 380 nm. Moreover, with regard to insect enticing wavelengths in the visible light range, Korean Patent Publication No. 2013-0049475 A and No. 2014-0010493 A disclose enticing activity of insects by white, yellow, red, green and blue light.

Preferably, the UV LED modules 161, 261, 361 emit light having a wavelength of 340 nm to 390 nm. More preferably, the UV LED modules 161, 261, 361 are controlled to emit light having a wavelength of about 365 nm, which strongly entices mosquitoes and has low harmfulness to humans.

Each of the UV LED modules 161, 261, 361 may include one or more chip-on-board (COB) type UV LED chips 165 or one or more LED packages mounted on a support substrate 164. The UV LED chips 165 or the UV LED packages may be arranged in a plurality of rows. Alternatively, the UV LED chips 165 or the UV LED packages may be disposed in a zigzag arrangement in order to prevent the support substrate 164 from overheating.

The support substrate 164 may have a panel shape having a predetermined thickness and include a printed circuit board (PCB) having an integrated circuit or interconnection lines therein. By way of example, the support substrate 164 may be a printed circuit board having a circuit pattern printed in a region on which the UV LED chip 165 will be mounted, and may be composed of a material such as a metal, a semiconductor, a ceramic, a polymer, and the like.

Specifically, each of the UV LED modules 161, 261, 361 may have a structure wherein the UV LED chips 165 are mounted on one surface of the PCB having an elongated plate shape. In each of the UV LED modules 161, 261, 361, the plurality of UV LED chips 165, for example, 4 to 10 UV LED chips 165 are arranged at certain intervals on the PCB in a longitudinal direction of the PCB. Heat dissipation fins may be provided to the other surface of the PCB to dissipate heat generated from the UV LED chips 165, and both ends of each of the UV LED modules 161, 261, 361 may be provided with terminals which will be connected to a power source to supply power to the PCB.

Although the insect trap may be further provided with a light guide plate and a diffusive sheet to allow the UV LED chips or the UV LED packages to emit sheet light, as needed, the UV LED chip or the UV LED package according to the exemplary embodiments may be disposed to emit spot light. Advantageously, a device for emitting spot light can be more easily manufactured while securing a higher insect attraction effect than a device for emitting sheet light.

Each of the UV LED modules may include a plurality of UV LED chips for emitting spot light, specifically 2 to 10 UV LED chips, preferably 3 to 6 UV LED chips, mounted on the support substrate.

The spot light source may be separated a distance of 2 mm to 50 mm, preferably, 3 mm to 30 mm, more preferably 3 mm to 20 mm, from another spot light source. If the distance between the spot light sources is less than 2 mm, excessive heat can be generated from the UV LED chips or from the UV LED packages, thereby causing deterioration in durability of the UV LED chips or the UV LED packages. If the distance between the spot light sources exceeds 50 mm, insect attraction efficiency of the insect trap can be deteriorated.

Each of the UV LED modules 161, 261, 361 may be manufactured to consume a power of 800 mA to 2,000 mA, preferably 1,000 mA to 1,500 mA, at an input voltage of 12V and an input current of 75 mA to 85 mA. Within this range, the UV LED modules 161, 261, 361 can effectively entice insects by emitting light having a wavelength of 365 mm and harmless to humans while minimizing power consumption.

In each of the UV LED modules 161, 261, 361, the UV LED chips 165 may be mounted on opposite surfaces of the support substrate 164 or two support substrates 164 each having the UV LED chips 165 mounted thereon may be bonded to each other such that light can be emitted from each of the UV LED modules 161, 261, 361 in opposite directions, thereby improving insect attraction efficiency with UV light.

In each of the UV LED modules 161, 261, 361, the UV LED chips 165 or the UV LED packages may be mounted on the support substrate 164 such that the UV LED chips 165 or the UV LED packages mounted on one surface of the support substrate 164 do not overlap the UV LED chips 165 or the UV LED packages mounted on the other surface of the support substrate 164. The UV LED chips 165 or the UV LED packages may be arranged in a plurality of rows or in a zigzag arrangement, without being limited thereto. Accordingly, the insect trap 1000 according to the first embodiment can minimize power consumption while enlarging an irradiation range, and can improve durability of each of the UV LED modules 161, 261, 361 through effective dissipation of heat generated from the UV LED chips 165.

While electric energy supplied to the UV LED modules 161, 261, 361 is converted into light energy and heat energy, heat is generated from the UV LED chips 165 and a space separated a distance of 5 mm or less from the UV LED chips 165 may have a temperature of 30° C. to 60° C. Since insects, particularly, mosquitoes, are strongly enticed towards a material having a temperature of about 38° C. to 40° C., which is similar to mammal body temperature, the insect trap 1000 can strongly entice insects through heat generated from the UV LED modules 161, 261, 361 in addition to enticing effects of the UV LED modules 161, 261, 361.

Accordingly, the insect trap 1000 according to the first embodiment of the present disclosure employs the UV LED modules 161, 261, 361 manufactured to consume a power of 800 mA to 2,000 mA, preferably 1,000 mA to 1,500 mA, at an input voltage of 12V and an input current of 75 mA to 85 mA, and includes the UV LED chips 165 or the UV LED packages mounted on the support substrate 164 such that the UV LED chips 165 or the UV LED packages mounted on one surface of the support substrate 164 do not overlap the UV LED chips 165 or the UV LED packages mounted on the other surface of the support substrate. Thus, the insect trap 1000 according to the first embodiment can emit light harmless to humans and having high insect enticing efficiency while minimizing power consumption and can generate heat such that surroundings of the insect trap 1000 have a temperature providing high insect enticing effects.

Embodiment 2

An insect trap 2000 (not shown) according to a second embodiment of the present disclosure has the same configuration as the insect trap according to the first embodiment except for a photocatalyst filter. Hereinafter, the photocatalyst filter will be described in detail.

The photocatalyst filter can perform a deodorization function using UV light emitted from the UV LED module 161 as a catalyst and can generate carbon dioxide. The photocatalyst filter may be disposed at any location in the insect trap 2000 so long as the photocatalyst filter can receive UV light emitted from the UV LED module 161. For example, the photocatalyst filter may be disposed on the main body 110, the insect filter 120, the air collector 130, the UV LED installation unit 160, the UV LED installation unit cap 162, and the mesh member 171, preferably on a lower surface of the UV LED installation unit 160 and/or a lower surface of the UV LED installation unit cap 162.

Preferably, the photocatalyst filter is embedded in the insect trap instead of being provided in a protrusion structure. Specifically, in a side-embedded type wherein the photocatalyst filter is embedded in a side surface of the insect trap 1000 to contact an air stream generated in the insect trap 1000, an inner space of the insect trap 1000 can be efficiently constituted without obstructing suction of insects and air into the insect trap 1000.

The photocatalyst filter may be formed by depositing a photocatalyst layer on a frame. By way of example, the photocatalyst filter may be formed by embedding a photocatalyst layer in a porous material, such as metal foam and carbon foam, or in a ceramic material.

The photocatalyst layer may include at least one compound selected from the group consisting of, for example, titanium oxide ($TiO_2$), silicon oxide ($SiO_2$), tungsten oxide ($WO_3$), zinc oxide ($ZnO$), zirconium oxide ($ZrO_2$), tin oxide ($SnO_2$), cerium oxide ($CeO_2$), iron oxide ($FeO_3$), zinc sulfide ($ZnS$), cadmium sulfide ($CdS$), and strontium titanate ($SrTiO_3$), which can act as photocatalyst media. In one example, the photocatalyst layer may be realized by coating a titanium oxide ($TiO_2$) layer, or by depositing cooking oil or a tangerine liquid onto a contact portion between the photocatalyst filter and a ceramic material.

The photocatalyst layer can generate CO2, which has high efficiency in enticement of mosquitoes, while providing the deodorization effect. Specifically, when the photocatalyst layer is irradiated with light emitted from the UV LED module 161 and inducing photocatalysis reaction, radicals exhibiting strong reducibility can be generated through photocatalysis reaction known in the art. Then, an organic component around the photocatalyst layer can be decomposed by the radicals to generate carbon dioxide. Carbon dioxide is known as a gas capable of enticing insects, particularly, mosquitoes. For example, light inducing photocatalysis reaction may be UV light in a wavelength band of about 200 nm to 400 nm. That is, since light inducing photocatalysis reaction has not only a function of generating radicals when reaching the photocatalyst layer, but also a function of enticing insects, the wavelength of light may be determined by taking into account two aspects, that is, photocatalysis reaction and direct enticement of insects.

In some embodiments, in order to promote generation of carbon dioxide, an enticing substance such as lactic acid, amino acid, sodium chloride, uric acid, ammonia and protein decomposition substances may be provided to the photocatalyst filter. By way of example, as a method of providing the enticing substance, the enticing substance may be deposited onto the photocatalyst layer in the photocatalyst filter or may be periodically or aperiodically sprayed onto the photocatalyst layer, without being limited thereto. As a result, the concentration of carbon dioxide increases, thereby improving insect enticing efficiency.

On the other hand, organic materials in air surrounding the photocatalyst filter are decomposed by the radicals generated by photocatalysis reaction, thereby providing an effect of purifying air around the insect trap 2000.

That is, the insect trap 2000 according to the second embodiment of the present disclosure can use not only light and heat generated from the UV LED module 161 but also carbon dioxide as insect enticing media, thereby significantly improving efficiency in enticing insects, particularly, mosquitoes.

Embodiment 3

Figure 23:
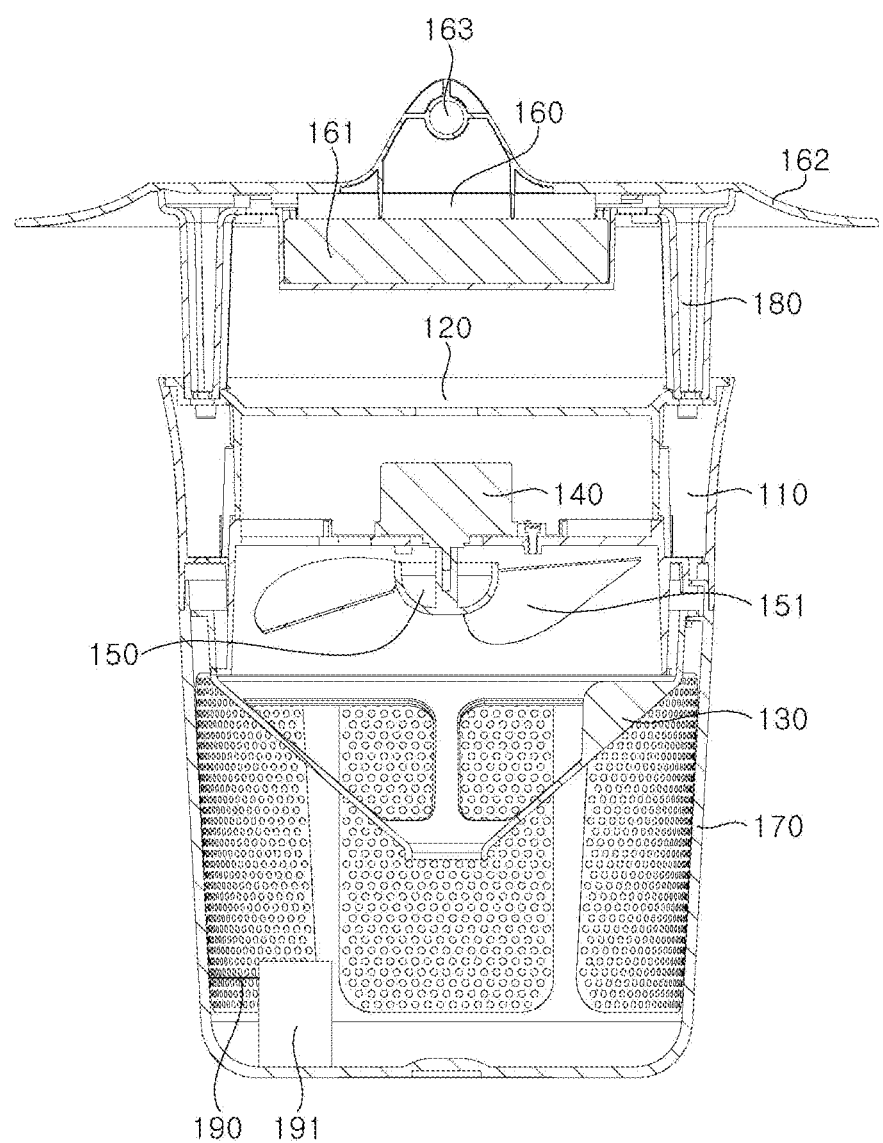
FIG. 23 is a side-sectional view of the insect trap according an exemplary embodiment.

Referring to FIG. 23, an insect trap 3000 according to a third exemplary embodiment may further include an insecticidal UV LED installation unit 190, on which an insecticidal UV LED module 191 is mounted. The insecticidal UV LED module 191 may emit light having a wavelength of 200 nm to 300 nm.

The insect trap 3000 according to the third exemplary embodiment is similar to the insect trap according to the first exemplary embodiment except that the insect trap 3000 further includes the insecticidal UV LED installation unit 190, on which the insecticidal UV LED module 191 is mounted. Thus, the following description will focus on the insecticidal UV LED installation unit 190, on which the insecticidal UV LED module 191 is mounted.

Although not limited to a particular location, the insecticidal UV LED installation unit 190 is preferably mounted on the insect collector 170 in which collected insects stay for the longest period of time.

That is, the insect trap 3000 can destroy insects, particularly mosquitoes, collected in the insect collector 170 not only by drying the insects, but also by irradiation with UVC though additional installation of the insecticidal UV LED module 191, which can secure good energy efficiency and insecticidal efficiency while rapid destroying the insects. Specifically, the insecticidal UV LED module 191 may be configured to emit UVC having a wavelength of 200 nm to 300 nm.

In addition, the insecticidal UV LED module 191 is controlled to generate an electrical energy of 1 kJ upon application of a voltage of 12 V to 20 V and an input current of 200 mA to 280 mA, thereby enabling destruction of insects collected in the insect collector with low energy for a relatively short time.

Embodiment 4

An insect trap 4000 (not shown) according to a fourth exemplary embodiment is similar to the insect trap according to the first exemplary embodiment except that the UV LED module 161 allows dimming control. Thus, the following description will focus on dimming control with respect to the UV LED module 161.

The insect trap 4000 according to the fourth exemplary embodiment is based on the fundamental concept that insect attraction efficiency can be further improved upon emission of decoy light while changing on/off, intensity and emission cycle of decoy light than upon emission of the decoy light with a constant intensity.

As used herein, the term "dimming control" includes not only the concept of controlling light output of a light emission unit, but also all control operations for controlling operation of the light emission unit, including on/off of the light emission unit, emission cycle of the light emission unit, and the like.

Figure 17:
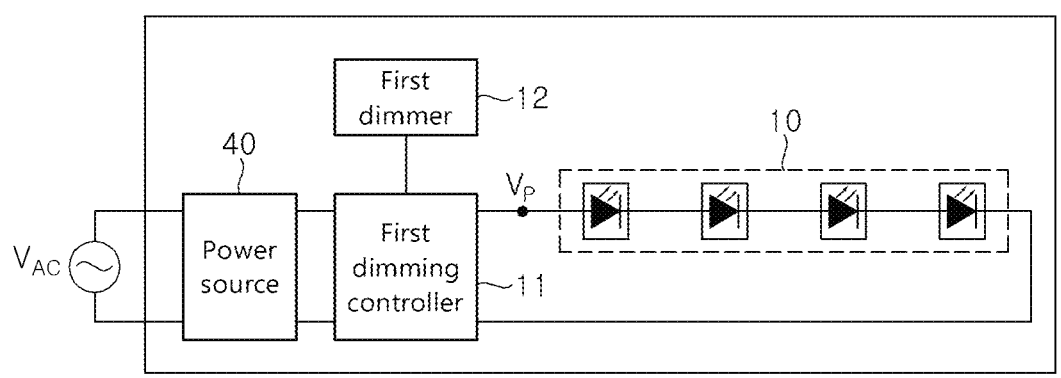
FIG. 17 is a block diagram illustrating an electrical connection relationship between components of the UV LED module according to an exemplary embodiment.
Figure 18:
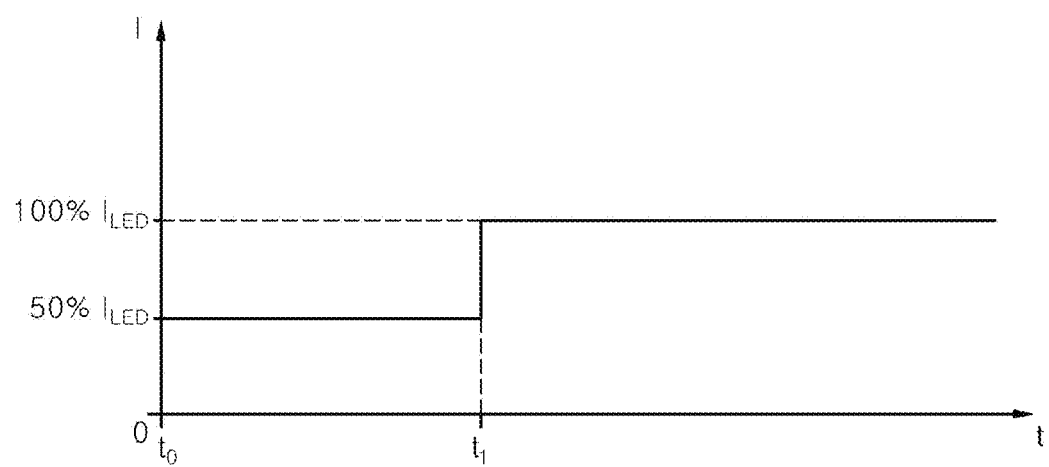
FIG. 18 to FIG. 20 are waveforms depicting a relationship between LED drive current or drive voltage and dimming level of the UV LED module according to an exemplary embodiment.
Figure 19:
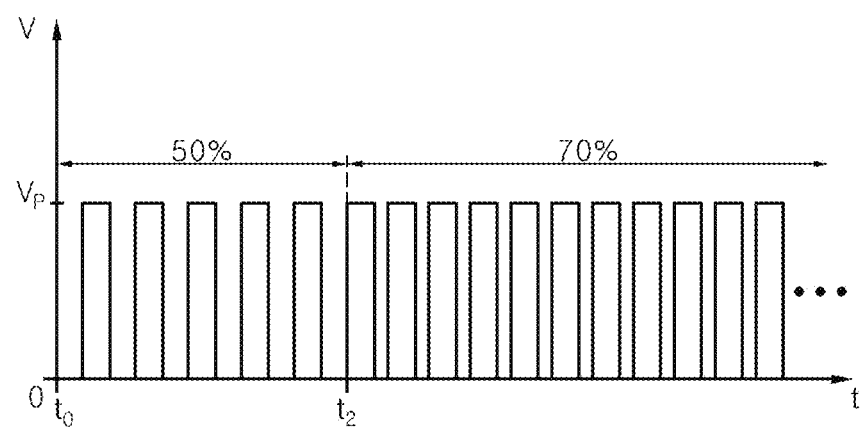
Figure 20:
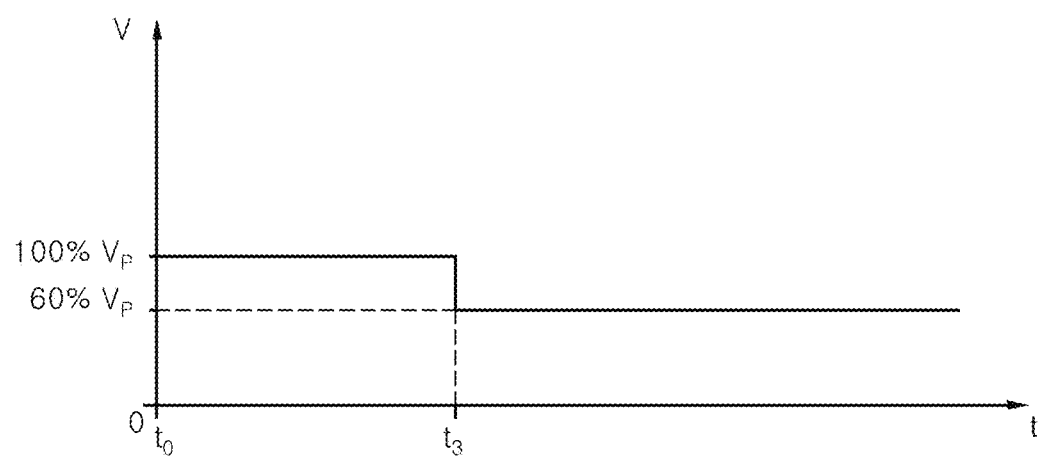

FIG. 17 is a block diagram illustrating an electrical connection relationship between components of the UV LED module according to the fourth exemplary embodiment. In addition, FIG. 18 to FIG. 20 are waveforms depicting a relationship between LED drive current or drive voltage and dimming level of the UV LED module according to the fourth exemplary embodiment. Hereinafter, referring to FIG. 17 to FIG. 20, a circuit design and features of the insect trap 4000 according to the fourth exemplary embodiment will be described.

First, as shown in FIG. 17, the insect trap 4000 according to the fourth exemplary embodiment may include a power source 40, a first light emission unit 10, a first dimming controller 11, and a first dimmer 12.

As shown in FIG. 17, the power source 40 is adapted to generate drive voltage Vp through rectification and stabilization of AC current (that is, input voltage Vac) supplied from an AC power source and to output the generated drive voltage Vp to the first light emission unit 10 and the first dimming controller 11. The power source 40 may include one of various power source circuits, such as a full-wave rectifier, a half-wave rectifier, SMPS, and the like. Herein, for convenience of description and understanding, the following description will be given with reference to an exemplary embodiment wherein the power source 40 is adapted to supply stabilized DC drive voltage Vp, that is, a DC drive type power source. However, it will be apparent to those skilled in the art that exemplary embodiments described herein are not limited to the DC drive type power source and may be applied to various types of insect traps including an AC drive type insect trap.

On the other hand, as described above, the first light emission unit 10 may include a plurality of LED chips or LED packages. Since the following description is given with reference to the exemplary embodiment wherein the insect trap is a direct drive type insect trap, the first light emission unit 10 has a single forward voltage level and is controlled as an integrated body. However, in an exemplary embodiment wherein the insect trap is an AC drive type insect trap, the first light emission unit 10 includes a plurality of LED groups, which may be sequentially turned on or off under control of the first dimming controller 11.

The first dimmer 12 is configured to receive a first dimming level for dimming control with respect to the first light emission unit 10. In addition, according to exemplary embodiments, the first dimmer 12 may be configured to act as an interface for programming a dimming level selection algorithm described below. Such a first dimmer 12 is not an essential component and may be optionally included in the insect trap 4000.

The first dimming controller 11 is configured to perform dimming control with respect to the first light emission unit 10 depending upon the first dimming level. The first dimming controller 11 may be configured to perform dimming control according to one of various dimming methods including, for example, an LED drive current control method, an LED drive voltage control method, a PWM control method, and a phase cut method. Herein, the first dimming level means a dimming level set with respect to the first light emission unit 10, a second dimming level means a dimming level set with respect to a second light emission unit 20, and a third dimming level means a dimming level set with respect to a third light emission unit 30.

FIG. 18 shows a waveform of an LED drive current $I_{LED}$ in an exemplary embodiment wherein the first dimming controller 11 performs dimming control by controlling the LED drive current $I_{LED}$ flowing through the first light emission unit 10. Such dimming control through control of the LED drive current is performed by allowing the first dimming controller 11 to control the LED drive current $I_{LED}$ depending upon the first dimming level, based on the fact that light output from an LED chip is proportional to the LED drive current $I_{LED}$. For example, for dimming control at a dimming level of 80%, the LED drive current $I_{LED}$ is controlled to 80% of an LED drive current $I_{LED}$ at a dimming level of 100%. FIG. 18 shows a waveform of the LED drive current $I_{LED}$, in which the first dimming level is 50% and the LED drive current $I_{LED}$ is controlled to 50% of the maximum LED drive current in a time zone t0-t1 and, at a time point t1, the first dimming level is changed to 100% and the LED drive current $I_{LED}$ is controlled to 100% of the maximum LED drive current. The current level of the LED drive current $I_{LED}$ is changed depending upon the dimming level, causing change of light output from the first light emission unit 10 corresponding thereto.

FIG. 19 shows a waveform of drive voltage Vp in an exemplary embodiment wherein the first dimming controller 11 performs dimming control through PMW (pulse width modulation) control of drive voltage Vp applied to the first light emission unit 10 in response to a PWM (pulse width modulation) signal generated based on the first dimming level. Referring to FIG. 19, in a time zone t0-t2, the first dimming level is 50% and the duty ratio of the PWM signal is controlled to 50%, and at a time point t2, the first dimming level is changed to 70% and the duty ratio of the PWM signal is controlled to 70%. Since the duty ratio of the drive voltage Vp applied to the first light emission unit 10 is changed depending upon the dimming level, thereby causing change of light output from the first light emission unit 10 corresponding thereto.

FIG. 20 shows a waveform of drive voltage Vp in an exemplary embodiment wherein the first dimming controller 11 performs dimming control by controlling the voltage level of the drive voltage Vp applied to the first light emission unit 10. Such dimming control through control of the LED drive voltage is performed by allowing the first dimming controller 11 to control the voltage level of the drive voltage Vp applied to the first light emission unit 10 depending upon the first dimming level, based on the fact that light output from an LED chip is proportional to the drive voltage Vp. FIG. 20 shows a waveform of the drive voltage Vp, in which the first dimming level is 100% and the LED drive voltage Vp is controlled to 100% of the maximum LED drive voltage in a time zone t0-t3 and, at a time point t3, the first dimming level is changed to 60% and the LED drive voltage Vp is controlled to 60% of the maximum LED drive voltage. The voltage level of the LED drive voltage Vp is changed depending upon the dimming level, thereby causing change of light output from the first light emission unit 10 corresponding thereto.

Although the above description is focused on dimming control with respect to the first dimming controller 11 using one dimming method, it will be apparent to those skilled in the art that the first dimming controller 11 may perform dimming control using a plurality of dimming methods selected from among the above and other dimming methods well-known to those skilled in the art.

The first dimming controller 11 may perform dimming control while changing the dimming level for each time period. In one example, the first dimming controller 11 may be configured to randomly select a dimming level for every 10 seconds and control light emission of the first light emission unit 10 for 10 seconds depending upon the selected dimming level. In another example, the first dimming controller 11 may be configured to select a dimming level according to a preset dimming level selection algorithm for every 10 seconds and control light emission of the first light emission unit 10 for 10 seconds depending upon the selected dimming level. For example, the dimming level selection algorithm may be configured to increase the dimming level from 10% to 100% by 10% for every 10 seconds and to decrease the dimming level from 100% to 10% by 10% for every 10 seconds after the dimming level reaches 100%. Obviously, it is apparent to those skilled in the art that this dimming level selection algorithm is given by way of illustration only and various dimming level selection algorithms may be used.

Figure 21:
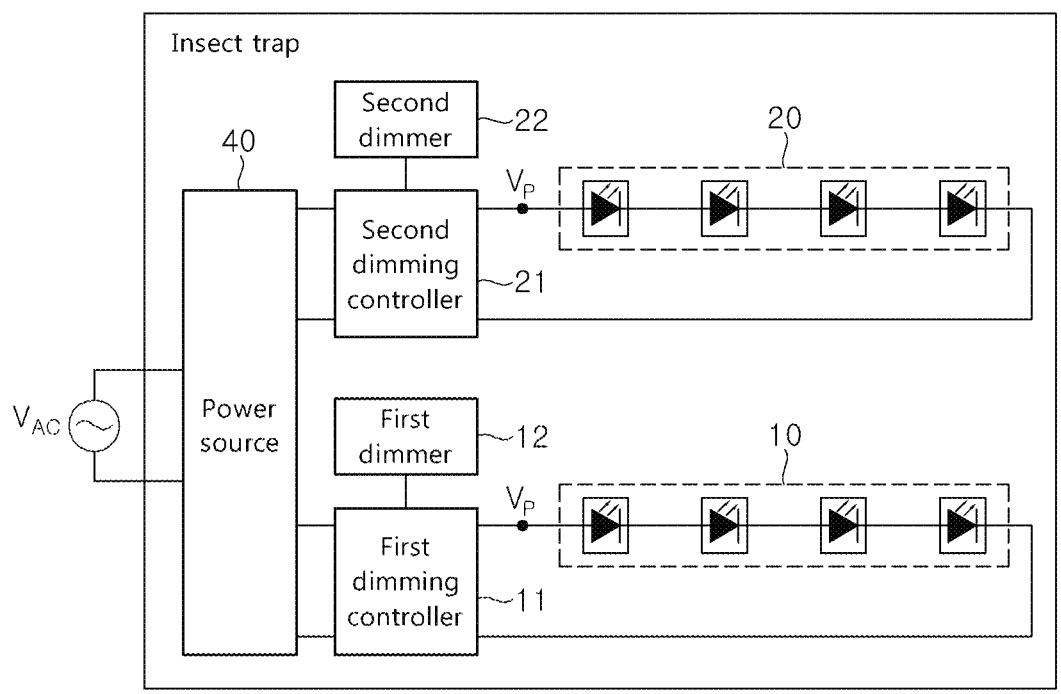
FIG. 21 is a block diagram illustrating an electrical connection relationship between components of the UV LED module according to an exemplary embodiment.
Figure 22:
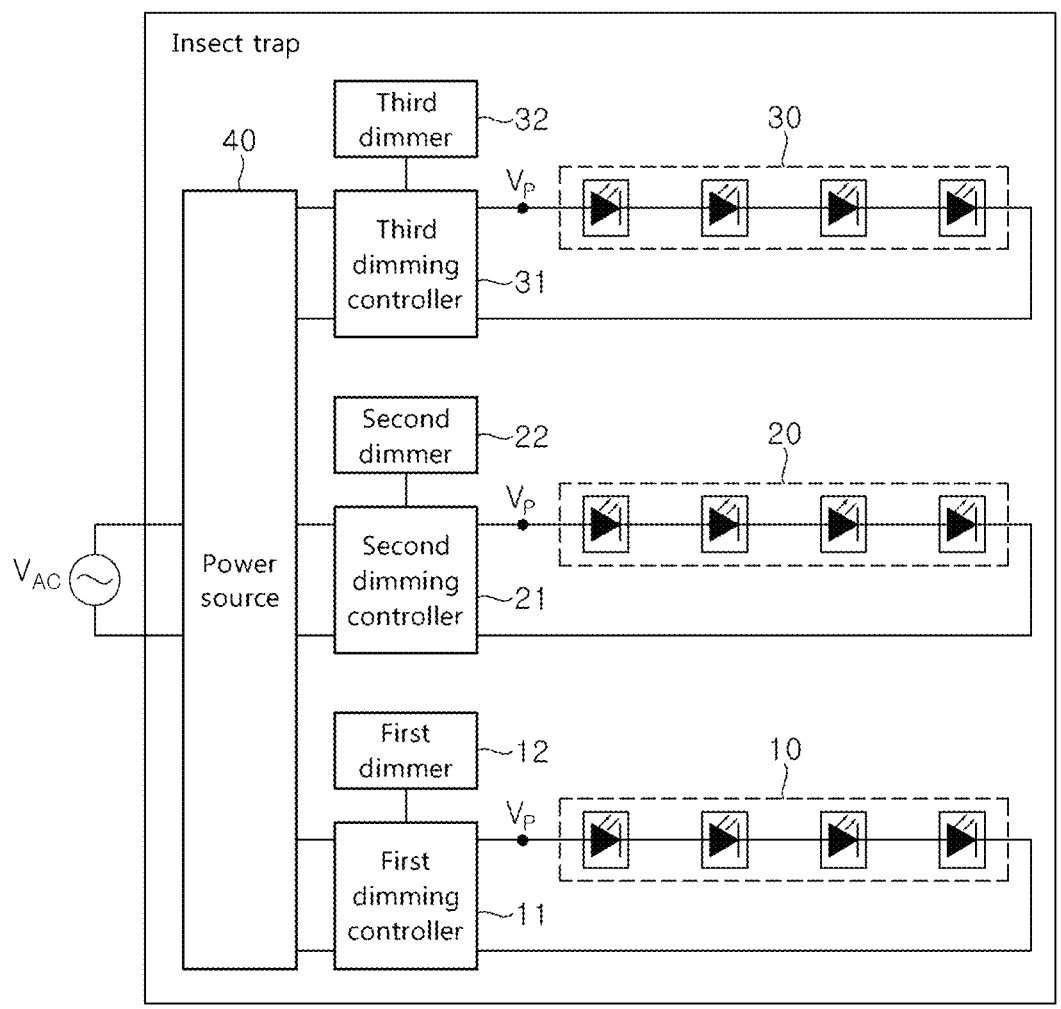
FIG. 22 is a block diagram illustrating an electrical connection relationship between components of the UV LED module according to an exemplary embodiment.

Referring to FIG. 21 to FIG. 22, in other exemplary embodiments, wherein the second light emission unit 20 has a different structure than the first light emission unit 10, the insect trap may further include a second dimming controller 21 and/or a third dimming controller 31 to control operation of the second light emission unit 20. In one example, the second light emission unit 20 may be configured to emit light having a different wavelength than the first light emission unit 10. Specifically, the first light emission unit 10 may be configured to emit light having a first wavelength for attraction of a first kind of insect and the second light emission unit 20 may be configured to emit light having a second wavelength for attraction of a second kind of insect. In another example, the second light emission unit 20 may include LED chips or LED packages having a different structure than those of the first light emission unit 10. If the second light emission unit 20 has a different structure than the first light emission unit 10, the second light emission unit 20 may have different physical characteristics (for example, forward voltage level) than the first light emission unit 10 and the second light emission unit 20 may be controlled by the second dimming controller 21. Further, even in an exemplary embodiment wherein the second light emission unit 20 has the same structure as the first light emission unit 10, the second light emission unit 20 is configured to allow dimming control by the second dimming controller 21 in order to allow dimming control with respect to the first light emission unit 10 and the second light emission unit 20 to be performed independently of each other.

The second dimming controller 21 is configured to perform dimming control with respect to the second light emission unit 20 depending upon the second dimming level. Like the first dimming controller 11 described above, the second dimming controller 21 may be configured to perform dimming control according to one of various dimming methods including, for example, an LED drive current control method, an LED drive voltage control method, a PWM control method, and a phase cut method. In addition, the second dimmer 22 is configured to receive the second dimming level for performing dimming control with respect to the second light emission unit 20 and may be optionally provided to the insect trap 4000, like the first dimmer 12.

The third dimming controller 31 is configured to perform dimming control with respect to the third light emission unit 30 depending upon the third dimming level. Like the first dimming controller 11 and the second dimming controller 21 described above, the third dimming controller 31 may be configured to perform dimming control according to one of various dimming methods including, for example, an LED drive current control method, an LED drive voltage control method, a PWM control method, and a phase cut method. In addition, the third dimmer 32 is configured to receive the third dimming level for performing dimming control with respect to the third light emission unit 30 and may be optionally provided to the insect trap 4000, like the first dimmer 12 and the second dimmer 22.

Next, the present invention will be described in more detail with reference to some examples. However, it should be understood that these examples are provided for illustration only and are not to be construed in any way as limiting the present invention.

Preparative Example 1

Referring to FIG. 3, an insect trap having a total height of 199 mm and including a main body 110 having a height of 54 mm, a collector 170 having a height of 110 mm and two buttresses 180 facing each other and each having a height of 35 mm was fabricated. The main body 110 and a UV LED installation unit 160 had a diameter of 133.5 mm; a UV LED installation unit cap 162 had a diameter of 200 mm; a maximum height difference between the UV LED installation unit and a UV LED installation unit cap was 8 mm; insect passage openings 121 had a total area of 4,882.1 mm2; mesh openings 173 had a total area of 9,269.3 mm2; and each of the insect passage openings 121 was set to have an area of 100 mm2 to 225 mm2 such that the insect filter 120 can selectively filter insects having a larger volume than mosquitoes while allowing mosquitoes to pass therethrough.

Further, the insect trap included a suction fan 150 having a diameter of 90 mm and three fan blades 151 having a height of 25 mm from a lowermost end to an uppermost end thereof and separated a minimum distance of 2 mm from an inner wall of the main body 110.

Referring to FIG. 10, air collector side openings 132 were arranged in a mesh shape, an air exhaust port 133 had a circular shape having a diameter of 16 mm, and an air collector 130 having a conical shape, the diameter of which gradually decreases from the suction fan 150 to the collector 170, was disposed between the suction fan 150 and the collector 170.

Furthermore, a UV LED module 161 was a double-side type PCB and included three UV LED chips 165 disposed in a zigzag arrangement on each side of the PCB. The UV LED module 161 was set to emit light having a wavelength of 365 mm at an input voltage of 12V and an input current of 75 mA to 85 mA.

Preparative Example 2 to 7

Insect traps were manufactured in the same manner as in Preparative Example 1 except that the number of fan blades 151 was set to 1, 2, 4, 5, 6, and 7, respectively.

Preparative Example 8 to 15

Insect traps were manufactured in the same manner as in Preparative Example 1 except that the mesh openings 173 had a total area of 8365.5 mm2, 7508.1 mm2, 6308.9 mm2, 5932.3 mm2, 4882.1 mm2, 4432.3 mm2, 3932.3 mm2, and 2932.3 mm2, respectively.

Preparative Example 16 to 20

Insect traps were manufactured in the same manner as in Preparative Example 1 except that the minimum separation distance from the fan blades 151 and the inner wall of the is main body 110 was set to 0.5 mm, 1 mm, 3 mm, 4 mm, and 5 mm, respectively.

Preparative Example 21 to 25

Insect traps were manufactured in the same manner as in Preparative Example 1 except that two buttresses 180 were set to have a height of 20 mm, 30 mm, 40 mm, 50 mm, and 60 mm, respectively.

Experimental Example 1 (Measurement of Collection Efficiency According to Power)

While the motor of the insect trap manufactured in Preparative Example 1 was controlled such that the suction fan 150 was rotated at 2,100 RPM and power applied to the UV LED module 161 was controlled as listed in the following Table 1, the insect trap was left outdoors under conditions of a temperature of 26±1° C. and a relative humidity of 50±5% for 6 hours, followed by measuring the number of mosquitoes collected in the insect trap.

TABLE 1

| Power (mW) | 600 | 1000 | 1500 | 2000 |
| --- | --- | --- | --- | --- |
| Number of collected mosquitoes | 19 | 33 | 31 | 18 |

As shown in Table 1, the insect trap according to the present disclosure had improved mosquito collection efficiency when power was controlled to 1,000 mW to 1,500 mW.

Experimental Example 2 (Measurement of the Number of Dead Mosquitoes and Air Stream Velocity According to Rotational Speed of Suction Fan and the Number of Fan Blades)

After each of the insect traps manufactured in Preparative Example 1 to 7 was left outdoors under conditions of a temperature of 26±1° C. and a relative humidity of 50±5% for 6 hours, the number of dead mosquitoes attached to the fan blades 151 of the suction fan 150 was counted, and results are shown in Table 2. In Table 2, when the number of mosquitoes attached to the fan blades 151 was 15 or less, the test result was evaluated as being good.

TABLE 2

Number of dead mosquitoes attached to fan blades according to RPM of suction fan

| Number of fan blades | 3000 RPM | 2800 RPM | 2250 RPM | 1800 RPM | 1500 RPM | 1400 RPM |
|---|---|---|---|---|---|---|
| 7 | 26 | 18 | 10 (good) | 5 (good) | 1 (good) | 1 (good) |
| 6 | 20 | 15 (good) | 6 (good) | 3 (good) | 1 (good) | 1 (good) |
| 5 | 17 | 15 (good) | 4 (good) | 2 (good) | 1 (good) | 0 (good) |
| 3 | 10 (good) | 9 (good) | 2 (good) | 1 (good) | 0 (good) | 0 (good) |
| 2 | 5 (good) | 3 (good) | 1 (good) | 0 (good) | 0 (good) | 0 (good) |
| 1 | 2 (good) | 0 (good) | 0 (good) | 0 (good) | 0 (good) | 0 (good) |

In addition, the air stream velocity was measured at an intermediate portion between an upper end of the main body 110 and the UV LED installation unit 160 in the insect trap manufactured in Preparative Example 1 to 7 using an air stream velocity tester (TSI 9515, TSI Co., Ltd.), and results are shown in Table 3. When the air stream velocity was in the range of 0.5 m/s to 2.5 m/s, the test result was evaluated as being good.

TABLE 3

Air stream velocity according to RPM of suction fan

| Number of fan blades | 3000 RPM | 2800 RPM | 2250 RPM | 1800 RPM | 1500 RPM | 1400 RPM |
|---|---|---|---|---|---|---|
| 7 | 1.8 m/s (good) | 1.5 m/s (good) | 1.1 m/s (good) | 0.8 m/s (good) | 0.7 m/s (good) | 0.6 m/s (good) |
| 6 | 1.6 m/s (good) | 1.3 m/s (good) | 1.0 m/s (good) | 0.7 m/s (good) | 0.6 m/s (good) | 0.5 m/s (good) |
| 5 | 1.4 m/s (good) | 1.2 m/s (good) | 0.9 m/s (good) | 0.6 m/s (good) | 0.5 m/s (good) | 0.4 m/s |
| 3 | 1.1 m/s (good) | 0.8 m/s (good) | 0.7 m/s (good) | 0.5 m/s (good) | 0.3 m/s | 0.3 m/s |
| 2 | 0.7 m/s (good) | 0.7 m/s (good) | 0.5 m/s (good) | 0.5 m/s (good) | 0.2 m/s | 0.2 m/s |
| 1 | 0.4 m/s | 0.4 m/s | 0.3 m/s | 0.2 m/s | 0.1 m/s | 0.1 m/s |

As shown in Tables 2 and 3, when the number of fan blades 151 of the suction fan 150 was two to six and the suction fan 150 was rotated at 1,500 RPM to 2,800 RPM, an air stream velocity of 0.5 m/s to 2.5 m/s was generated to provide high efficiency in enticement and suction of mosquitoes, and the number of dead mosquitoes attached to the fan blades 151 could be reduced.

Experimental Example 3 (Measurement of Air Stream Velocity According to Ratio of Total Area of Insect Passage Openings to Total Area of Mesh Member Openings)

While the motor of each of the insect traps manufactured in Preparative Example 1 and Preparative Example 8 to 15 was controlled such that the suction fan 150 was rotated at 2,100 RPM, the air stream velocity was measured at an intermediate portion between the upper end of the main body 110 and the UV LED installation unit 160 using an air stream velocity tester (TSI 9515, TSI Co., Ltd.), and results are shown in Table 4. When the air stream velocity was in the range of 0.5 m/s to 2.5 m/s, the test result was evaluated as being good.

TABLE 4

| A | 4882.1 | 4882.1 | 4882.1 | 4882.1 | 4882.1 | 4882.1 | 4882.1 | 4882.1 | 4882.1 |
|---|---|---|---|---|---|---|---|---|---|
| B | 9269.3 | 8365.5 | 7508.1 | 6308.9 | 5932.3 | 4882.1 | 4432.3 | 3932.3 | 2932.3 |
| C | 1.90 | 1.71 | 1.54 | 1.29 | 1.22 | 1.00 | 0.91 | 0.81 | 0.60 |
| D | 1.1 (good) | 1.1 (good) | 1.1 (good) | 1.1 (good) | 1.1 (good) | 1.0 (good) | 0.9 (good) | 0.7 (good) | 0.3 |

A: Total area of insect passage openings (mm2)
B: Total area of mesh member openings (mm2)
C: Ratio of A:B
D: Air stream velocity (m/s) measured at intermediate portion between upper end of main body and UV LED installation unit 160

As shown in Table 4, when the ratio of the total area of the insect passage openings 121 to the total area of the mesh openings 173 was 0.8 or more, the insect trap could generate an air stream velocity of 0.5 m/s to 2.5 m/s providing high efficiency in enticement and suction of mosquitoes.

Experimental Example 4 (Measurement of Air Stream Velocity and Noise Level According to Minimum Distance from Suction Fan to Inner Wall of Main Body)

While the motor of each of the insect traps manufactured in Preparative Example 1 and Preparative Examples 16 to 20 was controlled such that the suction fan 150 was rotated at 2,100 RPM, the air stream velocity was measured at an intermediate portion between the upper end of the main body 110 and the UV LED installation unit 160 using an air stream velocity tester (TSI 9515, TSI Co., Ltd.), and results are shown in Table 5. In addition, under conditions of normal noise of 29.8 dBA, a noise level was measured at a location separated a horizontal distance of 1.5 m from each of the insect traps manufactured in Preparative Example 1 and Preparative Examples 16 to 20 using a noise level tester (CENTER 320, TESTO Co., Ltd.), and results are shown in Table 5. When the air stream velocity was in the range of 0.5 m/s to 2.5 m/s and the noise level was 38 dBA or less, the test result was evaluated as being good.

TABLE 5

| E | 0.5 | 1 | 2 | 3 | 4 |
|---|-----|---|---|---|---|
| F | 1.6 (good) | 1.4 (good) | 1.1 (good) | 1.0 (good) | 0.8 (good) |
| G | 38.1 | 35.3 (good) | 33.4 (good) | 32.7 (good) | 31.5 (good) |

E: Shortest distance (mm) between suction fan and inner wall of main body
F: Air stream velocity (m/s) measured at intermediate portion between upper end of main body 110 and UV LED installation unit 160
G: Noise level (dBA)

As shown in Table 5, when the minimum distance from the suction fan 150 to the inner wall of the main body 110 was in the range of 1 mm to 5 mm, the insect trap could generate an air stream velocity of 0.5 m/s to 2.5 m/s providing high efficiency in enticement and suction of mosquitoes, and provided a noise level of 38 dBA or less.

Experimental Example 5 (Measurement of Air Stream Velocity and Collection Efficiency According to Separation Distance from UV LED Installation Unit to Upper End of Main Body)

While the motor of each of the insect traps manufactured in Preparative Example 1 and Preparative Examples 21 to 25 was controlled such that the suction fan 150 was rotated at 2,100 RPM, the air stream velocity was measured at an intermediate portion between the upper end of the main body 110 and the UV LED installation unit 160 using an air stream velocity tester (TSI 9515, TSI Co., Ltd.), and results are shown in Table 6. In addition, 15 hours after inputting 20 mosquitoes to a closed space, the number of mosquitoes collected in the insect trap was measured, and results are shown in Table 6. When the air stream velocity was in the range of 0.5 m/s to 2.5 m/s and collection ratio was 70% or more, the test result was evaluated as being good.

TABLE 6

| H | 20 | 30 | 35 | 40 | 50 |
|---|----|----|----|----|----|
| I | 1.5 (good) | 1.2 (good) | 1.1 (good) | 1.0 (good) | 0.9 (good) |
| J | 8 | 15 | 16 | 16 | 14 |
| K | 40 | 75 (good) | 80 (good) | 80 (good) | 70 (good) |

H: Height of buttress 180 (mm)
I: Air stream velocity (m/s) measured at intermediate portion between upper end of main body 110 and UV LED installation unit 160
J: Number of collected mosquitoes
K: Collection ratio (%)

As shown in Table 6, when the distance between the upper end of the main body 110 and the UV LED installation unit 160 was in the range of 20 mm to 50 mm, the insect trap could generate an air stream velocity of 0.5 m/s to 2.5 m/s providing high efficiency in enticement and suction of mosquitoes, and could improve mosquito collection efficiency.

Experimental Example 6

The RPM of the suction fan 150 of the insect trap manufactured in Preparative Example 1 was gradually increased and controlled such that the air stream velocity measured at an intermediate portion between the upper end of the main body 110 and the UV LED installation unit 160 using an air stream velocity tester (TSI 9515, TSI Co., Ltd.) was in the range of 0.5 m/s to 3.0 m/s. An average number of collected mosquitoes and a noise level at each air stream velocity were measured.

To measure the average number of collected mosquitoes, the number of mosquitoes collected in the insect trap was measured five times and averaged 15 hours after inputting 20 mosquitoes to a closed space, and the noise level was measured at a location separated a horizontal distance of 1.5 m from the insect using a noise level tester (CENTER 320, TESTO Co., Ltd.), and results are shown in Table 7. When the air stream velocity was in the range of 0.5 m/s to 2.5 m/s, the collection ratio was 70% or more, and the noise level was 38 dBA or less, the test result was evaluated as being good.

TABLE 7

| L | 0.5 (good) | 0.7 (good) | 1.0 (good) | 1.5 (good) | 2.0 (good) | 3.0 |
|---|------------|------------|------------|------------|------------|-----|
| M | 0.5 | 14.0 | 14.0 | 14.5 | 15 | 15.5 |
| N | 2.5 | 70.0 (good) | 70.0 (good) | 72.5 (good) | 75 (good) | 77.5 (good) |
| O | 25.2 (good) | 28.5 (good) | 33.4 (good) | 35.3 (good) | 38.0 (good) | 39.0 |

L: Air stream velocity (m/s) measured at intermediate portion between upper end of main body 110 and UV LED installation unit 160
M: Average number of collected mosquitoes
N: Collection ratio (%)
O: Noise level (dBA)

As shown in Table 7, when the air stream velocity measured at an intermediate portion between the upper end of the main body 110 and the UV LED installation unit 160 was in the range of 0.7 m/s to 2.0 m/s, the collection ratio of mosquitoes was 70% or more, which is a value evaluated as good, and the noise level was 38 dBA or less.

In addition, Experimental Data 7 to 9 were obtained using an insect trap according to exemplary embodiments in order to confirm the effect of destroying mosquitoes by an insecticidal UV LED module.

Experimental Data 7

Detailed conditions of the UV LED module are shown as follows and experimental results are shown in Table 8.

Intensity of illumination: 82.6 µW/cm$^2$ (at 30 mm), 73.08 µW/cm$^2$ (at 70 mm)
Insecticidal UV LED module: wavelength of 275 nm, four UV LED chips mounted thereon
Voltage: 16.025 V
Current: 0.24 A
Light irradiation distance: 70 mm

TABLE 8

| Record time | Elapsed time (second) | Energy (mJ) | Number of destroyed insects | Accumulated number of destroyed insects | Lethality |
|-------------|----------------------|-------------|------------------------------|------------------------------------------|-----------|
| 10:01 | 0 | — | 0 | 0 | 0.0 |
| 10:15 | 900 | 65,772 | 3 | 3 | 25.0 |
| 10:34 | 1800 | 131,544 | 0 | 3 | 25.0 |
| 10:45 | 2700 | 197,316 | 0 | 3 | 25.0 |
| 11:01 | 3600 | 263,088 | 0 | 3 | 25.0 |
| 11:15 | 4500 | 328,860 | 2 | 5 | 41.7 |
| 11:30 | 5400 | 394,632 | 0 | 5 | 41.7 |

TABLE 8-continued

| Record time | Elapsed time (second) | Energy (mJ) | Number of destroyed insects | Accumulated number of destroyed insects | Lethality |
|---|---|---|---|---|---|
| 12:15 | 8100 | 591,948 | 0 | 5 | 41.7 |
| 13:00 | 10800 | 789,264 | 0 | 5 | 41.7 |
| 13:30 | 12600 | 920,808 | 0 | 5 | 41.7 |
| 14:00 | 14400 | 1,052,352 | 1 | 6 | 50.0 |
| 16:00 | 21600 | 1,578,528 | 2 | 8 | 66.7 |
| 18:30 | 30600 | 2,236,248 | 2 | 10 | 83.3 |
| 19:00 | 32400 | 2,367,792 | 0 | 10 | 83.3 |

As shown in Table 8, it can be confirmed that a mosquito lethality approaches 50% at an energy of 1 KJ or more.

Experimental Data 8

Detailed conditions of the UV LED module are shown as follows and experimental results are shown in Table 9.

Intensity of illumination: 172.2 µW/cm$^2$ (at 30 mm), 145.7 µW/cm$^2$ (at 70 mm)

Insecticidal UV LED module: wavelength of 275 nm, four UV LED chips mounted thereon Voltage: 16.025 V
Current: 0.24 A
Light irradiation distance: 70 mm

TABLE 9

| Record time | Elapsed time (second) | Energy (mJ) | Number of destroyed insects | Accumulated number of destroyed insects | Lethality |
|---|---|---|---|---|---|
| 18:12 | 0 | — | 10 |  | 0.0 |
| 18:27 | 1500 | 131,130 | 2 | 2 | 6.7 |
| 19:00 | 4500 | 393,390 | 5 | 7 | 23.3 |
| 19:30 | 5100 | 655,650 | 4 | 11 | 36.7 |
| 20:00 | 8100 | 917,910 | 7 | 18 | 60.0 |
| 20:30 | 8700 | 1,180,170 | 3 | 21 | 70.0 |
| 21:00 | 11700 | 1,442,430 | 2 | 23 | 76.7 |

As shown in Table 9, it can be confirmed that a mosquito lethality approaches 50% at an energy of 1 KJ or more.

Experimental Data 9

Detailed conditions of the UV LED module are shown as follows and experimental results are shown in Table 10.

Intensity of illumination: 172.2 µW/cm$^2$ (at 30 mm), 145.7 µW/cm$^2$ (at 70 mm)

Insecticidal UV LED module: wavelength of 275 nm, four UV LED chips mounted thereon Voltage: 16.025 V
Current: 0.24 A
Light irradiation distance: 70 mm

TABLE 10

| Record time | Elapsed time (second) | Energy (mJ) | Number of destroyed insects | Accumulated number of destroyed insects | Lethality |
|---|---|---|---|---|---|
| 10:50 | 0 | — | 0 | 0 | 0.0 |
| 11:05 | 900 | 131,130 | 0 | 0 | 0.0 |
| 11:20 | 1800 | 393,390 | 0 | 0 | 0.0 |
| 11:35 | 2700 | 393,390 | 2 | 2 | 5.0 |
| 11:50 | 3600 | 524,520 | 7 | 9 | 22.5 |
| 12:05 | 4500 | 655,650 | 0 | 9 | 22.5 |
| 12:20 | 5400 | 786,780 | 7 | 16 | 40.0 |
| 12:35 | 6300 | 917,910 | 2 | 18 | 45.0 |
| 12:50 | 7200 | 1,049,040 | 2 | 20 | 50.0 |
| 13:05 | 10800 | 1,573,560 | 2 | 22 | 55.0 |
| 13:35 | 14400 | 2,098,080 | 1 | 23 | 57.5 |
| 13:50 | 18000 | 2,622,600 | 4 | 27 | 67.5 |
| 14:50 | 21600 | 3,147,120 | 1 | 28 | 70.0 |
| 15:50 | 25200 | 3,671,640 | 4 | 32 | 80.0 |
| 16:50 | 28800 | 4,196,160 |  | 32 | 80.0 |

As shown in Table 10, it can be confirmed that a mosquito lethality approaches 50% at an energy of 1 KJ or more.

Although some embodiments have been described with reference to the accompanying drawings, it should be understood that these embodiments are given by way of illustration only, and that various modifications, variations, and alterations can be made by those skilled in the art without departing from the spirit and scope of the present disclosure. The scope of the present disclosure should be limited only by the accompanying claims and equivalents thereof.

What is claimed is:

1. An insect trap configured to attract and collect insects with ultraviolet (UV) light, the insect trap comprising:
    a main body;
    an insect filter detachably coupled to the main body and configured to selectively allow insects to pass therethrough;
    an air collector disposed at a lower side of the main body;
    a motor disposed between the air collector and the insect filter;
    a suction fan disposed between the motor and the air collector and rotated by the motor;
    a UV light-emitting diode (LED) installation unit disposed above the insect filter and comprising a UV LED module mounted thereon;
    a buttress supporting the UV LED installation unit above the main body while separating the UV LED installation unit from the main body so as to allow insects to be suctioned into a space between the main body and the UV installation unit;
    an insect collector detachably coupled to the air collector and comprising a mesh through which air is discharged outside from the insect trap by the suction fan; and
    the air collector having a conical shape, a diameter of which gradually decreases with distance away from the suction fan,
    wherein the insect filter comprises a lattice shape comprising a plurality of insect passage openings selectively allowing insects to pass therethrough, the plurality of insect passage openings being defined by intersecting circular members and radial members,
    the air collector comprises air collector ribs, air collector side openings, and an air exhaust port such that insects suctioned by the suction fan can be discharged to the insect collector,
    the UV LED module comprises one or more chip-on-board (COB) type UV LED chips or one or more UV LED packages comprising UV LED chips mounted on a support substrate,
    the UV LED module being provided with the UV LED chips on opposite surfaces of the support substrate to allow light to be emitted from the UV LED module in opposite directions thereof, and
    the UV LED chips or the UV LED packages being mounted on the support substrate to prevent a UV LED chip or a UV LED package mounted on one surface of the support substrate from overlapping another UV LED chip or another UV LED package mounted on an opposite surface of the support substrate.

2. The insect trap according to claim 1, wherein the insect passage openings are spaced apart from each other by a plurality of circular members and a plurality of radial members arranged around a center of the insect filter in an arc shape having a central angle of 20° to 40°, each of the circular members being spaced apart from another adjacent circular member by a distance of 1.0 cm to 1.5 cm.

3. The insect trap according to claim 1, wherein a ratio of vertical distance from the main body to the UV LED installation unit to height of the main body ranges from 1:1 to 1:2.

4. The insect trap according to claim 1, wherein a ratio of vertical distance from the insect collector to the UV LED installation unit to height of the insect collector ranges from 1:0.5 to 1:2.

5. The insect trap according to claim 1, wherein the air collector is mounted on the lower side of the main body and comprises the air collector ribs, the air collector side openings, and the air exhaust port such that insects suctioned by the suction fan can be discharged to the insect collector,
the air collector having a conical shape, the diameter of which gradually decreases away from the suction fan, and
a ratio of diameter of the air exhaust port to diameter of the suction fan ranges from 1:2 to 1:9.

6. The insect trap according to claim 1, wherein the mesh comprises mesh ribs and mesh openings formed between the mesh ribs such that an air stream generated by the suction fan is discharged from the insect collector through the mesh openings, and a ratio of total area of the insect passage openings to total area of the mesh openings ranges from 1:1.2 to 1:3.0.

7. The insect trap according to claim 1, wherein the UV LED module is mounted on the UV LED installation unit such that light emitted from the UV LED module travels in a horizontal direction with respect to gravity, and the UV LED installation unit is provided with a transparent UV LED module cover having a shape corresponding to the UV LED module and protecting the UV LED module.

8. The insect trap according to claim 1, wherein the UV LED installation unit is provided on a lower surface thereof with a photocatalyst filter capable of generating carbon dioxide using UV light emitted from the UV LED module as a catalyst.

9. The insect trap according to claim 1, wherein the UV LED module emits a light output of 1,000 mW to 1,500 Mw at an input voltage of 10 V to 15V and an input current of 75 mA to 100 mA.

10. The insect trap according to claim 1, further comprising:
a UV LED installation unit cap mounted on an upper surface of the UV LED installation unit and extending beyond the UV LED installation unit in a horizontal direction,
wherein an air stream generated by the suction fan has a velocity of 0.5 m/s to 3.0 m/s in a region defined by a first region extending downward from the UV LED installation unit cap in a vertical direction and a second region extending from the main body in a horizontal direction.

11. The insect trap according to claim 1, wherein the UV LED module comprises:
a power source configured to supply a drive voltage; and
a first dimming controller performing dimming control with respect to a first light emission unit depending upon a first dimming level.

12. The insect trap according to claim 11, wherein the first dimming controller controls a current level of LED drive current flowing through the first light emission unit depending upon the first dimming level.

13. The insect trap according to claim 12, wherein the first dimming controller controls the drive voltage applied to the first light emission unit through pulse width modulation (PWM) control depending upon the first dimming level.

14. The insect trap according to claim 12, wherein the first dimming controller controls a voltage level of the drive voltage applied to the first light emission unit depending upon the first dimming level.

15. The insect trap according to claim 12, wherein the first dimming controller performs dimming control with respect to the first light emission unit depending upon a changed dimming level while periodically changing the first dimming level according to a preset reference.

16. The insect trap according to claim 12, wherein the UV LED module further comprises a second dimming controller performing dimming control with respect to a second light emission unit depending upon a second dimming level, and the power source further supplies the drive voltage to the second light emission unit.

17. The insect trap according to claim 12, wherein the UV LED module further comprises a third dimming controller performing dimming control with respect to a third light emission unit depending upon a third dimming level, and the power source further supplies the drive voltage to the third light emission unit.

18. The insect trap according to claim 1, wherein the buttress is detachably coupled to the insect filter and is secured thereto by the insect filter.

19. The insect trap according to claim 1, wherein the buttress is inserted between an outer wall and an inner wall of the main body and is secured to the main body by a buttress fastening member.

20. The insect trap according to claim 10, wherein the UV LED installation unit cap is secured to the UV LED installation unit by fastening a UV LED installation unit cap-fastening member to a UV LED installation unit cap-coupling hole formed in the UV LED installation unit, the UV LED installation unit cap-fastening member protruding from a lower surface of the UV LED installation unit cap.

21. The insect trap according to claim 10, wherein the UV LED installation unit is provided with a transparent UV LED module cover having a shape corresponding to the UV LED module and protecting the UV LED module, and the UV LED installation unit cap is provided at a lower side thereof with a UV LED module-securing member and a first UV LED module cover-securing member to secure the UV LED module and the UV LED module cover to the UV LED installation unit.

22. The insect trap according to claim 1, wherein the buttress is provided in plural and the UV LED module is disposed between the buttresses to block light emitted from the UV LED module at a side of the UV LED module instead of blocking the light in front of the UV LED module.

23. The insect trap according to claim 22, wherein the UV LED installation unit further comprises a UV LED module insertion hole through which the UV LED module is mounted on the UV LED installation unit, and
a length of a side surface of the buttress formed in a horizontal direction with respect to a direction of light emitted from the UV LED module is 1 to 3 times longer than a length of a side surface of the UV LED module insertion hole formed in the horizontal direction with respect to the direction of light emitted from the UV LED module.

24. The insect trap according to claim 20, further comprising:
   a UV LED installation unit cap-fastening member cap formed on an upper surface of the UV LED installation unit cap-coupling hole and covering the UV LED installation unit cap-fastening member.

25. The insect trap according to claim 21, further comprising:
   a second UV LED module cover-securing member protruding from the UV LED module-securing member, the second UV LED module cover-securing member securing the UV LED module cover by applying pressure in a vertical direction or a horizontal direction with reference to an upper surface of the UV LED installation unit.

* * * * *